(12) United States Patent
Sinharoy

(10) Patent No.: US 7,000,096 B1
(45) Date of Patent: Feb. 14, 2006

(54) BRANCH PREDICTION CIRCUITS AND METHODS AND SYSTEMS USING THE SAME

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/631,726

(22) Filed: Aug. 3, 2000

(51) Int. Cl.
   *G06F 9/00* (2006.01)
(52) U.S. Cl. ...................... 712/240; 712/239
(58) Field of Classification Search ................ 712/234, 712/239, 233, 240
   See application file for complete search history.

(56) References Cited

U.S. PATENT DOCUMENTS

| | | | |
|---|---|---|---|
| 5,142,634 A | 8/1992 | Fite et al. | 395/375 |
| 5,367,703 A | 11/1994 | Levitan | 395/800 |
| 5,553,253 A * | 9/1996 | Pan et al. | 712/240 |
| 5,564,118 A | 10/1996 | Steely, Jr. et al. | 395/375 |
| 5,758,142 A * | 5/1998 | McFarling et al. | 712/239 |
| 5,794,028 A | 8/1998 | Tran | 395/587 |
| 5,805,878 A * | 9/1998 | Rahman et al. | 712/239 |
| 5,857,098 A * | 1/1999 | Talcott et al. | 712/240 |
| 5,875,325 A | 2/1999 | Talcott | 395/587 |
| 5,935,241 A * | 8/1999 | Shiell et al. | 712/240 |
| 5,964,869 A | 10/1999 | Talcott et al. | 712/236 |
| 6,223,280 B1 * | 4/2001 | Horton et al. | 712/240 |
| 6,272,623 B1 * | 8/2001 | Talcott | 712/239 |
| 6,272,624 B1 | 8/2001 | Giacalone et al. | 712/239 |
| 6,289,441 B1 | 9/2001 | Talcott et al. | 712/239 |
| 6,332,189 B1 * | 12/2001 | Baweja et al. | 712/238 |
| 6,502,188 B1 * | 12/2002 | Zuraski et al. | 712/234 |

OTHER PUBLICATIONS

Rosenberg, Jerry M. Dictionary of Computers, Information Processing, and Telecommunications. Second Edition. New York: John Wiley & Sons, ©1987. p. 376, memory.*
American Heritage® Dictionayr of the English Language, Fourth Edition. ©2000. Search terms: modify, shift, and append. http://dictionary.reference.com/.*
Heuring, Vincent P. and Jordan, Harry F. "Computer Systems Design and Architecture". Reading, Mass.: Addison-Wesley Longman, Inc., ©1997. pp. 534-537.*

* cited by examiner

*Primary Examiner*—Eddie Chan
*Assistant Examiner*—Aimee Li
(74) *Attorney, Agent, or Firm*—Winstead Sechrest & Minick P.C.; Mark E. McBurney

(57) ABSTRACT

A method of generating a Global History Vector includes the steps of determining if a selected group of instructions contains a branch instruction. A current Global History Vector is maintained in a shift register when the selected group does not contain a branch instruction. A first value is shifted into the shift register to generate a second vector if the selected group contains a branch instruction which is predicted to be a branch taken. A second value is shifted into the shift register to generate a second vector when the selected group contains a branch instruction and the selected group does not include a branch instruction predicted to be a branch taken.

20 Claims, 16 Drawing Sheets

| ADDRESS OF THE BRANCH 58a | BHT 58b | FIRST GHV 58c-1 | SECOND GHV 58c-2 | THIRD GHV 58c-3 | BRANCH PREDICTION 58d | BRANCH POSITION 58e |
|---|---|---|---|---|---|---|

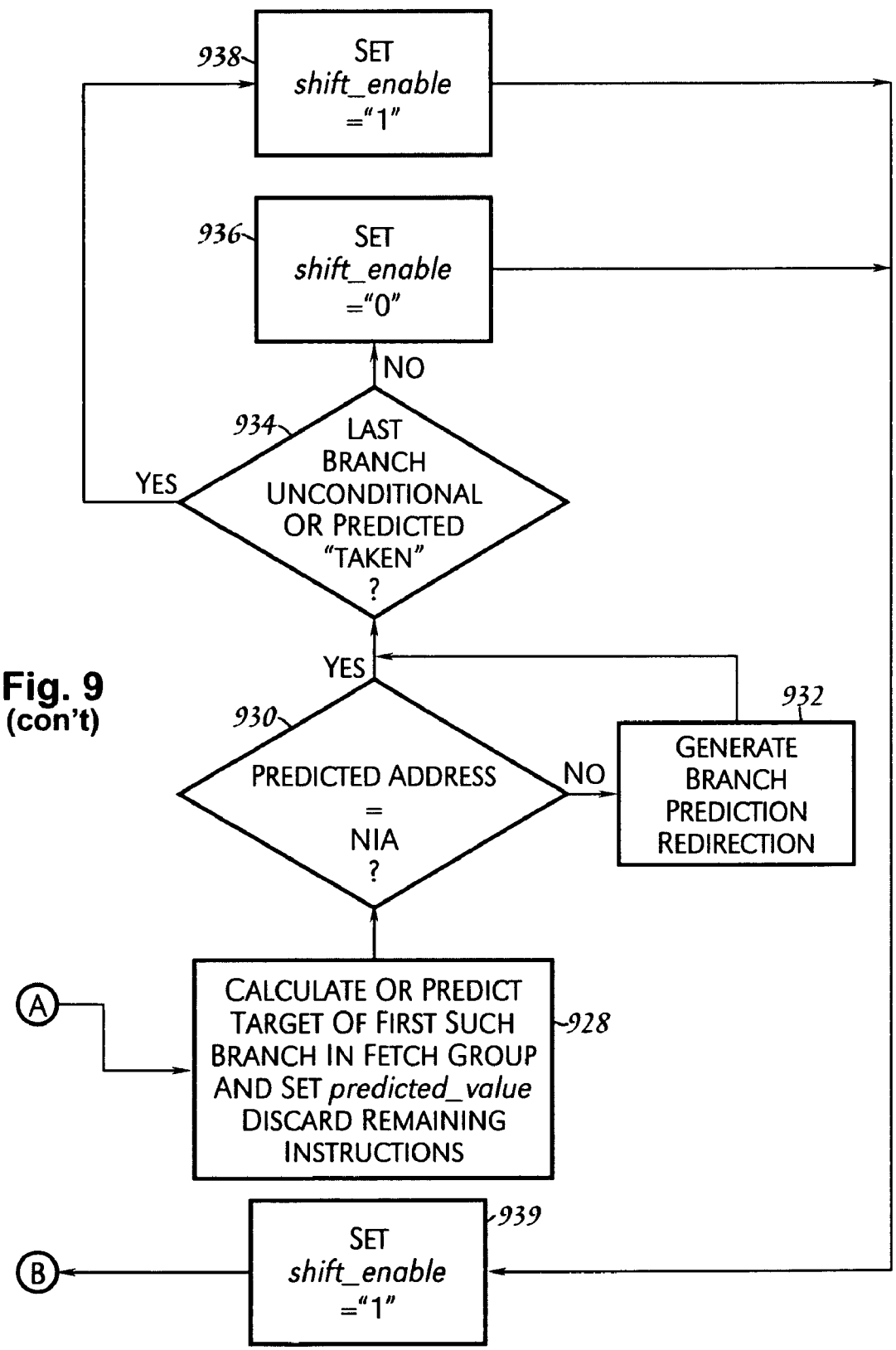
Fig. 9 (con't)

(con't)

BRANCH PREDICTION CIRCUITS AND METHODS AND SYSTEMS USING THE SAME

CROSS REFERENCE TO RELATED APPLICATIONS

The present invention is related to the following U.S. patent applications which are incorporated herein by reference:

Ser. No. 09/631,725 entitled "Global History Vector Recovery Circuits and Methods and Systems Using the Same," filed concurrently herewith;

Ser. No. 09/435,065 entitled "Circuits and Methods for Prefetching Instructions and Data Processing System Using Same"; and Ser. No. 09/475,030 entitled "Circuits, Systems and Methods for Performing Branch Predictions by Selectively Accessing Bimodal and Fetch-Based Branch History Tables."

TECHNICAL FIELD

The present invention relates generally to data processing, and in particular to branch prediction circuits and methods and systems using the same.

BACKGROUND INFORMATION

In deeply pipelined processors, successful dynamic branch prediction is crucial to high speed operation. Consequently, a number of branch prediction mechanisms have been developed. One specific mechanism is the Gshare branch prediction mechanism in which a vector is created which captures the outcome of a fixed number of branches that have been fetched immediately before the current instruction fetch. This vector is typically created by shifting a logic 1 or logic 0 into the last position of a shift register when the outcome of a given branch is determined, with a logic 1 representing a branch taken outcome and a logic 0 representing a branch not taken outcome. The bits of the vector are then bitwise XORed with appropriate bits of the current address. The resulting address is used to index into a branch history table entry which typically is a counter which maintains a value which is used for making the prediction (taken/not taken) for the branch.

In highly pipelined superscalar processors, however, instructions are fetched into the pipeline well in advance of their actual execution. As a result, in a high frequency processor, the vector in a conventional Gshare register will be based on branch outcomes which have been determined several cycles before the predicted execution of the current instruction. In other words, outcome data for more temporally proximate branches are not available in the vector at the time the vector is needed to make the current prediction.

Consequently, the need has arisen for circuits and methods for improving branch prediction accuracy. Such circuits and methods should not unnecessarily complicate the existing instruction pipeline structure and should not substantially impact the instruction pipeline timing.

SUMMARY OF THE INVENTION

The principles of the present invention are disclosed in a method of generating a Global History Vector which includes the step of determining if a selected group of instructions contains a branch instruction. The current Global History Vector in a shift register is maintained when the selected group does not contain a branch instruction. A first value is shifted into the shift register to generate a second vector if the selected group contains a branch instruction and the branch instruction is predicted as a branch taken. On the other hand, a second value is shifted into the shift register to generate a second vector when the selected group contains a branch instruction and the selected group does not include a branch instruction predicted as a branch taken.

The inventive principles are also disclosed in methods of performing branch predictions. According to one such method, a branch history table is indexed using a first Global History Vector associated with a first fetch group of instructions during a first fetch cycle to retrieve a first prediction value. A second Global History Vector associated with a second fetch group of instructions is then selectively generated. The first vector is retained when the first fetch group does not contain at least one branch instruction. A bit of a first value is appended to the first vector when the first fetch group has at least one branch instruction which is predicted as a branch taken and a bit of a second value is appended when the first group contains at least one branch instruction but contains no branch instructions predicted to be a branch taken. The second Global History Vector is then used during a second fetch cycle to index the branch history table and retrieve a second branch prediction value.

The principles of the present invention are also embodied in circuits and systems including branch processing circuitry having a shift register for storing a Global History Vector and control circuitry for selectively updating a first Global History Vector stored in that shift register. The control circuitry determines if a selected group of instructions contains a branch instruction. The first Global History Vector is then maintained in the shift register when the selected group does not contain a branch instruction. Otherwise, a first value is shifted into the shift register to generate a second vector if the selected group contains a branch instruction and the branch instruction is predicted as a branch taken or a second value is shifted into the shift register when the selected group contains a branch instruction but does not contain a branch instruction predicted as a branch taken.

A processing system is also disclosed which includes a microprocessor having a branch history table for storing branch prediction values, a global history shift register for storing a Global Branch History Vector, and logic for generating an index to the branch history table and accessing prediction values stored therein using selected bits of a Branch History Vector stored in the shift register. The microprocessor also includes control circuitry for updating the Global Branch History Vector stored in the shift register. This control circuitry is operable to retain a current vector stored in the shift register when a selected fetch group does not contain at least one branch instruction, shift a bit of a first value into the shift register when the selected fetch group has at least one branch instruction predicted to be a branch taken, and shift a bit of a second value into the shift register when the fetch group contains at least one branch instruction but contains no branch instructions predicted to be a branch taken.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2B illustrates a portion of the selected operational blocks of FIG. 2A in further detail;

DETAILED DESCRIPTION

Figure 1:
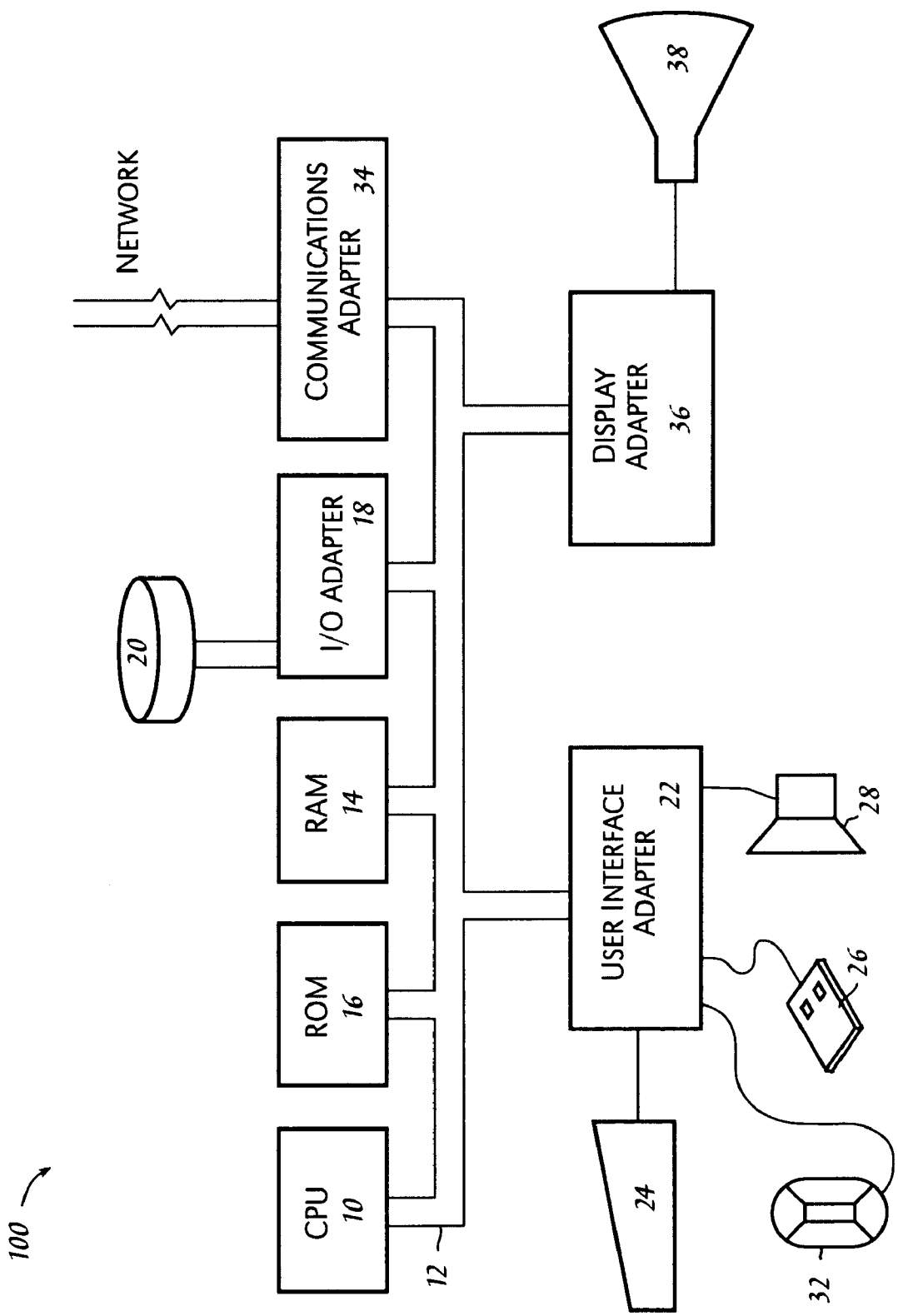
FIG. 1 is a high level functional block diagram of a representative data processing system suitable for practicing the principles of the present invention.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

All such variations are intended to be included within the scope of the present invention. It will be recognized that, in the drawings, only those signal lines and processor blocks necessary for the operation of the present invention are shown.

Furthermore, during a description of the implementation of the invention, the terms "assert" and "negate" and various grammatical forms thereof, are used to avoid confusion when dealing with the mixture of "active high" and "active low" logic signals. "Assert" is used to refer to the rendering of a logic signal or register bit into its active, or logically true, state. "Negate" is used to refer to the rendering of a logic signal of register bit into its inactive, or logically false, state.

Referring to the drawings, depicted elements are not necessarily shown to scale, and like or similar elements are designated by the same reference numeral through the several views.

Referring to FIG. 1 is a high level functional block diagram of a representative data processing system 100 suitable for practicing the principles of the present invention. Processing system 100, includes a central processing system (CPU) 10 operating in conjunction with a system bus 12. CPU 10 may be for example, a reduced instruction set computer (RISC), or a complex instruction set computer (CISC). System bus 12 operates in accordance with a standard bus protocol, such as the ISA protocol, compatible with CPU 10.

CPU 10 operates in conjunction read-only memory (ROM) 16 and random access memory (RAM) 14. Among other things, ROM 16 supports the basic input output system (BIOS). RAM 14 includes for example, DRAM (Dynamic Random Access Memory) system memory and SRAM (Static Random Access Memory) external cache.

I/O Adapter 18 allows for an interconnection between the devices on system bus 12 and external peripherals, such as mass storage devices (e.g., a hard drive, floppy drive or CD/ROM drive), or a printer. A peripheral device 20 is for example, coupled to a peripheral control interface (PCI) bus, and I/O adapter 18 therefore may be for example PCI bus bridge.

User interface adapter 22 couples various user input devices, such as keyboard 24, mouse 26, touchpad 32 or speaker 28 to the processing devices on bus 12.

Display adapter 36 supports a display 38 which may be for example a cathode ray tube (CRT), liquid crystal display (LCD) or similar conventional display unit. Display adapter 36 may include among other things a conventional display controller and frame buffer memory.

System 100 can be selectively coupled to a computer or telecommunications network through communications adapter 34. Communications adapter 34 may include for example, a modem for connection to a telecommunications network and/or hardware and software for connecting to a computer network such as a local area network (LAN) or wide area network (WAN).

Figure 2A:
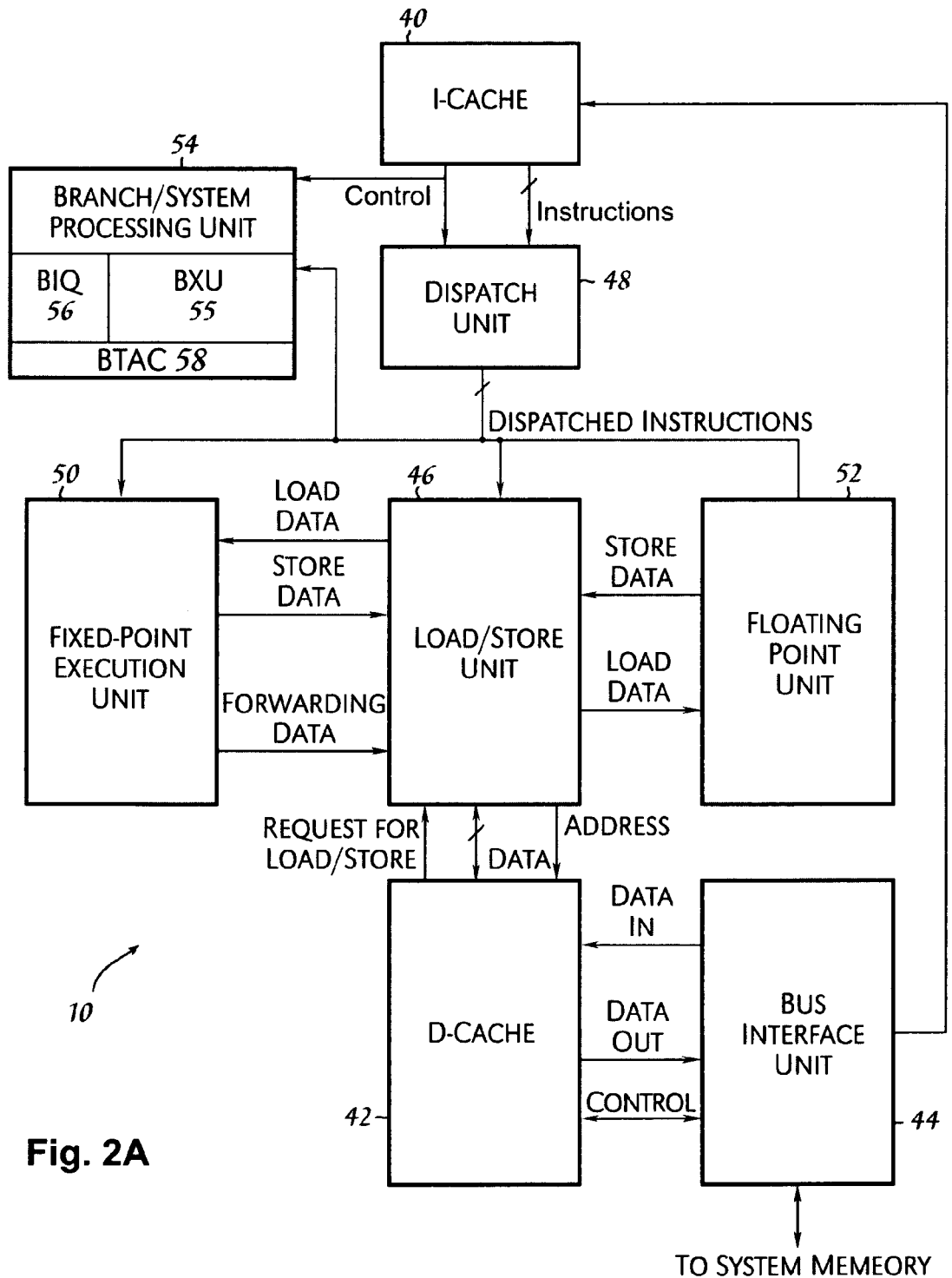
FIG. 2A is a high level functional block diagram of selected operational blocks within CPU.

FIG. 2A is a high level functional block diagram of selected operational blocks within CPU 10. In the illustrated embodiment, CPU 10 includes internal instruction cache (I-cache) 40 and data cache (D-cache) 42 which are accessible through bus 12 and bus interface unit 44 and load/store unit 46. In the depicted architecture, CPU 10 operates on data in response to instructions retrieved from I-cache 40 through instruction dispatch unit 48. In response to dispatch instructions, data retrieved from D-cache 42 by load/store unit 46 can be operated upon using either fixed point execution unit 50 or floating point execution unit 52. Instruction branching is controlled by branch/system processing unit 54.

Within branch/system processing unit 54 of the present embodiment are the Branch Execution Unit (BXU) 55, Branch Target Address Cache 58 and Branch Instruction Queue (BIQ) 56. BTAC 58 may be implemented by an associative memory which stores the addresses to a set of instructions each associated with an index. The indices are a set of bits selected from known branch instruction addresses. Thus, if a branch instruction occurs, the address to the predicted next instruction can be quickly accessed. A detailed description of a BTAC which may be used in the present invention is found in the commonly-owned copending U.S. patent application entitled "Circuits and Methods for Prefetching Instructions and Data Processing System Using Same," which is hereby incorporated herein by reference. BIQ 56 contains a plurality of entries 58. An entry 58 is shown in FIG. 2B, in which, entry 58 has a plurality of fields 58a–58e. Field 58a holds a branch instruction address, 58b contains a plurality of bits from a plurality of branch history table (BHT), each of fields 58c1–58c3 holds one of a sequence of global history vectors (GHVs), field 58d incorporates a branch prediction value and field 58e contains a branch position value. Each of fields 58a–58e will be discussed further below, in conjunction with FIGS. 3–9. Returning to FIG. 2A, BXU 55 executes branch instructions, and accordingly, determines an outcome of the branch instruction being executed, that is, if the branch is taken or not taken. BXU 55 may also provide a signal indicating that a branch instruction has executed in a current cycle of CPU 10, which may, for illustrative purposes, be referred to as an execution valid signal.

Global History Shift Register 60 contains a vector representing the actual (or predicted) outcomes for a selected number of fetch groups that has been fetched (but not discarded). In the present discussion, it will be assumed that the number of instructions in a fetch group is eight (8), although this number can vary from implementation to implementation, and the principles of the present invention are equally applicable to an embodiment having a predetermined number p of instructions in a fetch group. For the fetch groups that have been executed, the combined direction is stored, while for the branches that have been fetched but not yet executed, only the prediction for the direction is stored. The content of this register is XORed with selected bits in the IFAR to generate the address of an entry in at least one branch history table (BHT) for reading. For writing, an m-bit address is generated from m bits of the address of the executed branch by XORing the top n of these bits with the Global History Vector (GHV) at the time of prediction (obtained from the BIQ). In an embodiment of the present invention, m may be fourteen and n may be eleven.

In the illustrated embodiment, the GHV comprises a string of 0s and 1s, each representing the combined branch outcome (or prediction) of eleven fetch groups that appeared earlier in the predicted path leading to the instruction referred to by the IFAR. (Again, the principles of the present invention equally apply to an embodiment having a predetermined number, p, of fetch groups.) A "0" represents that the corresponding fetch group has one or more fall through conditional branch(es). A "1" represents that the corresponding fetch group has an unconditional branch or a taken conditional branch. No bit is shifted in the Global History Register (i.e., the GHV remains unchanged) if the corresponding fetch group does not have any branch in it.

Since the fetching of an instruction precedes its execution by several cycles, the outcome of some of the more recent branches (which correspond to the low order bits in GHV) may not be known, because those branches have not been executed yet. In these cases, the predicted outcome for these branches is used to update the GHV. So at any given point, bits 0 through "i−1" of the GHV are set based on the actual outcome of the branches in the corresponding fetch groups and from "i" through 10 are set based on the predicted outcome of the branches in the corresponding fetch group ("i" can range from 0 to 10, in an embodiment in which the GHV has eleven bits).

As long as there is no branch misprediction, the bits in the GHV register represent the actual branch outcomes (irrespective of whether they were set after the corresponding branch has been resolved or not). When there is a branch misprediction, the bit corresponding to the branch that has been mispredicted (and the rest of the bits representing subsequent conditional branches) are no longer accurate predictors of the outcome of the future branches. At this point the GHV register is reset to values obtained from the BIQ.

It should be noted, since up to eight branches, in the exemplary embodiment, can potentially be predicted in each cycle and the number of conditional branches in a group of eight instructions are not readily available, it is not possible to insert the prediction bits of the new conditional branches as they are fetched.

Figure 3A:
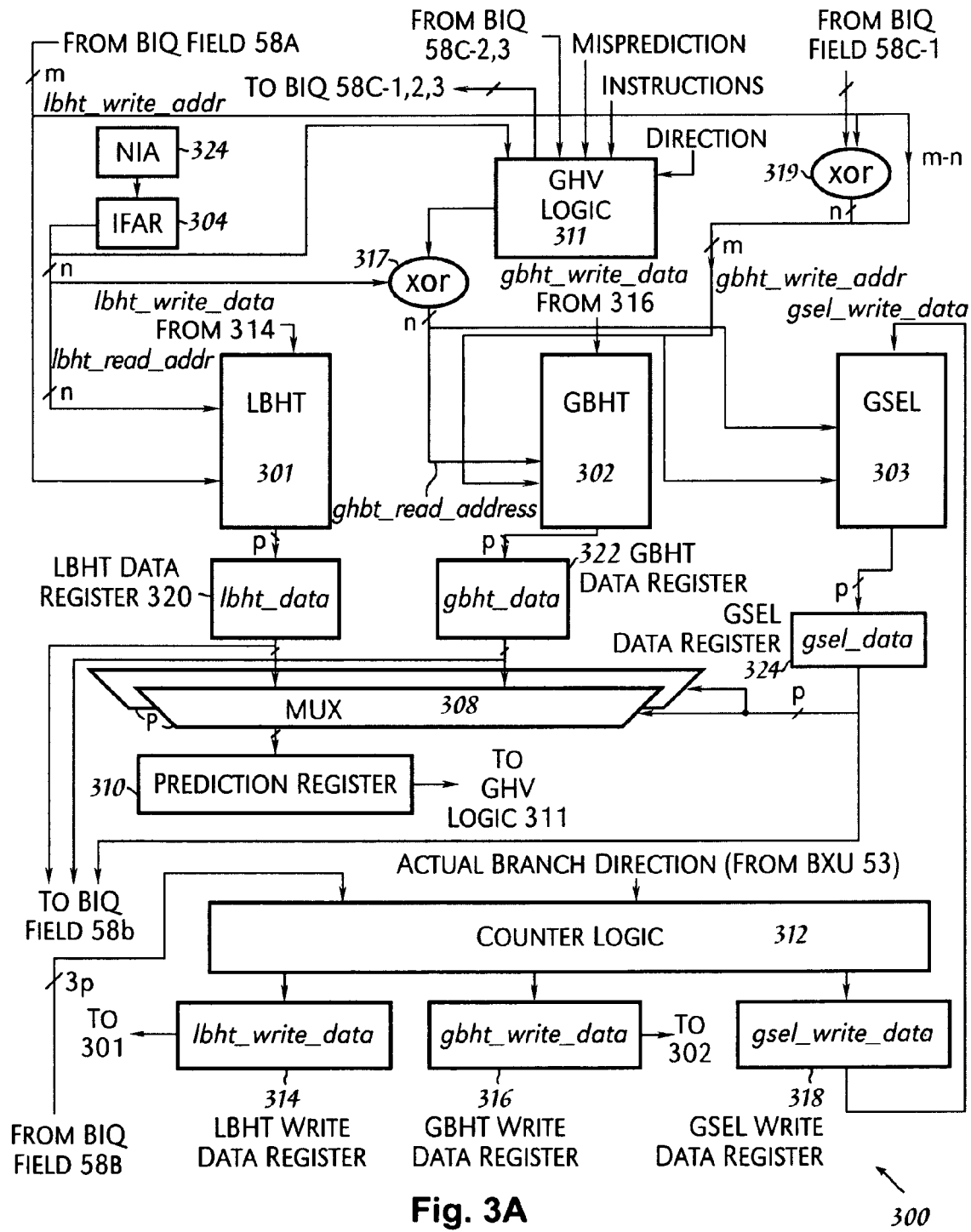
FIG. 3A is a partial schematic illustration of branch prediction circuitry embodying principles of the present invention.

Refer now to FIG. 3A illustrating a branch prediction apparatus 300 in accordance with an embodiment of the present invention. Apparatus 300 may be incorporated in branch unit 54, FIG. 2. According to these concepts, three tables are used for branch prediction, namely, a local branch history table (LBHT) 301, a fetch-based branch history table (GBHT) 302 and a selector table (GSEL) 303. In the illustrated embodiment, each table 301–303 is composed of a preselected number, $2n^2$, of entries each of which includes a number, p, of 1-bit counters. In the exemplary embodiment, p may be eight. For purposes of the present discussion, when a given one of the counters in the local or fetch-based branch history tables is set to a logic "1", that counter (entry) will be considered as being set to a taken branch prediction value. Consequently, in this configuration, a counter (entry) storing a logic "0" will be considered as storing a branch not-taken-prediction bit. It should be noted however, that in alternate embodiments, the reverse logic may be used without deviating from the inventive concepts. (LBHT 301, GBHT 302 and GSEL 303 are described in further detail in the commonly owned U.S. patent application Ser. No. 09/435,070, entitled "Circuits, Systems and Methods for Performing Branch Predictions by Selectively Accessing Bimodal and Fetch-Based Branch History Tables," hereby incorporated herein by reference.)

Local branch history table 301 is accessed for obtaining branch predictions using a pointer constituting n bits taken from the current cache line address, in instruction fetch address register (IFAR) 304 in a conventional fashion. The value of this pointer will be denoted lbht_read_addr. Fetch-based branch history table 302 is accessed for obtaining branch predictions in a fashion in which n number of bits taken from the current cache line address are bitwise XORed (XOR 317) with the n number of bits from GHV logic 311. (In the exemplary embodiment, described above, n may be eleven.) The value of this pointer will be denoted gbht_read_addr. The process for accessing the history tables is described in detail in the above-referenced U.S. patent application entitled "Circuits, Systems and Methods for Performing Branch Predictions by Selectively Accessing Bimodal and Fetch-Based Branch History Tables."

The entries of GSEL 303 may be accessed for obtaining predictions using the same pointer generated for the fetch-based branch history table, gbht_read_addr. The accessed entry from selector table 303 is then used by selection logic 308 to select either the local branch prediction values output from LBHT 301 or the fetch-based branch prediction value accessed from GBHT 302 for use as the final branch prediction value for determining if the branch is to be taken or not taken. Selection logic 308 may, in an embodiment of the present invention, be p multiplexers (MUXs), which output the p prediction values to prediction register 310. Note that a number q of the prediction values may be from LBHT 301 and a remaining number, p-q, may be from GBHT 302. Up to p instructions are fetched from memory, including internal memory, such as I-cache 40, FIG. 2, in one cycle of CPU 10. (The time interval occupied by a cycle of the CPU may be referred to herein as a "period.") Thus, the number of predictions in an entry accommodates all of the instructions that are fetched in a single cycle, which may be referred to as a fetch group (FG). The number, p, of instructions in a fetch group may be eight in an embodiment of the present invention. In the illustrated embodiment, a logic "0" accessed from selector table (GSEL) 303 selects the output from LBHT 301 while a logic "1" selects the output from GBHT 302. Generally, selector table 303 tracks the performance of the local and fetch-based branch history tables for a given branch instruction. The branch history table having the better prediction history for the given branch instruction is then used to perform the current branch prediction.

The GHV from which the gbht_read_addr is generated as described above tracks the history of branch instructions as they are fetched and executed. Thus, as branches are executed and resolved, the GHV is updated. GHV logic 311 updates the GHV and is described in detail in conjunction with FIG. 3B–FIG. 5B.

Additionally, the entries in LBHT 301, GBHT 302 and GSEL 303 must also be updated in response to the execution of branch instructions. The entries are updated by providing information to the appropriate entry in LBHT 301, GBHT 302 and GSEL 303 for setting or resetting, as appropriate, the p one-bit counters in the corresponding entry, depending on the prediction and the resolution, or actual outcome, of the branch. The information sent to LBHT 301 may be referred to as lbht_write_data, the update information provided to GBHT 302 may be referred to as gbht_write_data, and the update information for GSEL 303 may be referred to gsel_write_data. The values of lbht_write_data, gbht_write_data and gsel_write_data are generated by counter logic 312 and loaded, respectively, into LBHT write data register 314, GBHT write data register 316 and GSEL write data register 318. Counter logic 312 generates the values of lbht_write_data, gbht_write_data and gsel_write_data in response to an actual branch direction determined when the corresponding branch instruction executes, and the predictions, from BIQ field 58b in the entry 57 corresponding to the resolved branch instruction. The methodology for generating the values of lbht_write_data, gbht_write_data and gsel_write_data are described in detail in the aforementioned commonly owned, co-pending U.S. patent application entitled "Branch Prediction Circuits, and Methods and Systems Using Same."

The corresponding entry in the respective one of LBHT 301, GBHT 302 and GSEL 303 is accessed using an address generated from the branch address, field 58a, in the corresponding entry 58 (FIG. 2B) in BIQ 56. The address into LBHT 301, which may be referred to as lbht_write_addr, constitutes the m-bit branch address in field 58a. A number, n, of bits of lbht_write_addr are used to select the LBHT entry and the remaining, m-n, bits index the counters in the selected entry. Thus, $2^{(m-n)}$=p. Note that the m-bit branch address may be a portion of the full address of a branch instruction. The address for accessing GBHT 302 and GSEL 303, which may be referred to as gbht_write_addr, is generated by the exclusive-OR (XOR 319) of n bits of the branch address from BIQ field 58a with the GHV value (GHV0) in BIQ field 58c1 corresponding to the branch instruction for which the history table entries are being updated. (GHV0 represents the value of the GHV in the current cycle.) The resulting n bit value is concatenated with the remaining m-n bits of the branch address infield 58a to form the m-bit value of gbht_write_addr. The n-bit portion addresses the entry of the GBHT and the (m-n)-bit portion indexes the counters in the entry. As discussed above, an embodiment of the present invention may have a value of m of fourteen and an n of eleven. The methodology for addressing LBHT 301, GBHT 302 and GSEL 303, and updating the entries therein has been described in detail in the commonly-owned, copending U.S. patent application entitled "Branch Prediction Circuits and Methods and Systems Using Same", incorporated herein by reference.

Figure 3B:
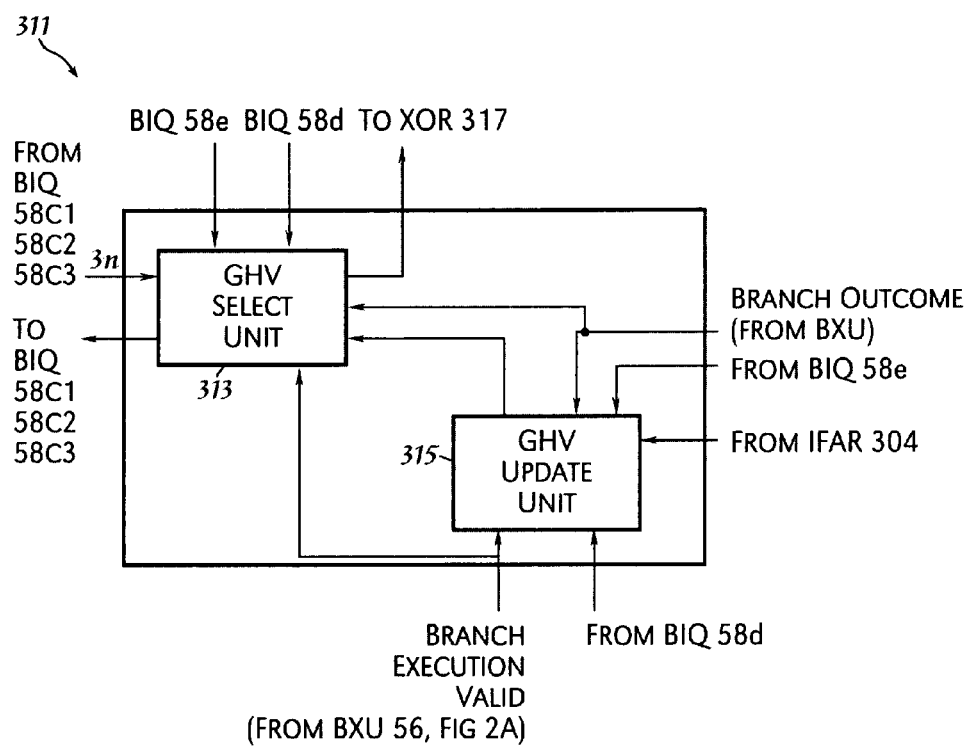
FIG. 3B illustrates a portion of the circuitry of FIG. 3A in further detail.

FIG. 3B illustrates GHV logic 311 in additional detail. GHV logic 311 includes GHV select unit 313 and GHV update unit 315. Select unit 313 selects the GHV to be used in accessing the branch history tables in response to branch prediction and execution events. Update unit 315 updates the values of the GHV as fetch groups are fetched and branch instructions are executed. The logic and operation of GHV units 313 and 315 will be described hereinbelow in conjunction with FIGS. 4, 5A, 5B and 6–9.

Figure 4:
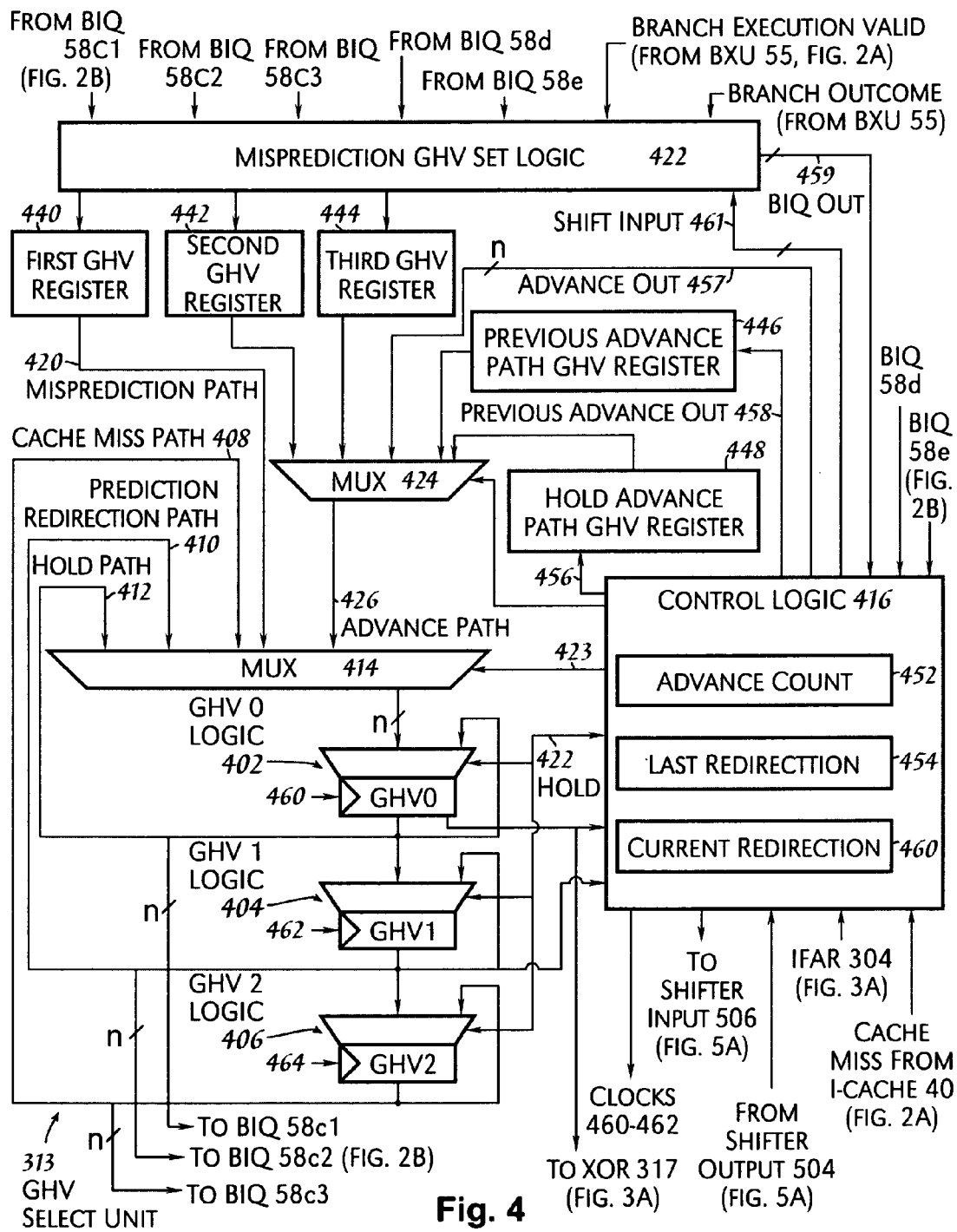
FIG. 4 illustrates, in partial schematic form, a portion of the circuitry of FIG. 3B in further detail.

Refer now to FIG. 4 illustrating GHV select unit 313 in further detail. The current value of GHV, which provided to XOR 317, FIG. 3A, is output from GHV0 logic 402. GHV0 logic 402 may be a register having a two-way multiplexer input. (As would be recognized by an artisan of ordinary skill, the multiplexer input is a two-way, n-fold device selecting between two, n-bit, input signals.) A first input to the multiplexer portion is coupled to an output of multiplexer (MUX) 414. Multiplexer 414 selects for outputting a GHV value from one of several paths that are rendered active in response to an event that may give rise to an instruction fetch redirection, for example, a cache miss, a branch misprediction, a pipeline hold, etc. Each of these paths and the operation of GHV select logic 313 will be described in detail below.

Depending on the outcome of speculatively fetched instructions, a prior state of the GHV may need to be recovered. That is, the GHV may need to be "backed up" to a previous state. GHV1 logic 404 and GHV2 logic 406 operate to hold the GHV for one and two additional processor cycles, respectively. GHV1 logic 404 and GHV2 logic 406 may also be a register having a two-way multiplexer input. The GHV0, GHV1 and GHV2 logic are cascaded with an output of the register portions of GHV0 logic 402 and GHV1 logic 404 being coupled to an input of the MUX portion of GHV1 logic 404 and GHV2 logic 406, respectively. In each of GHV0 logic 402, GHV1 logic 404 and GHV2 logic 406 the register output is also fed back to a second input of the multiplexer portion. Each multiplexer portion of logic 402, 404 and 406 selects between the two, n-fold, inputs in response to hold 422. Hold 422 may be asserted by the processor when the instruction pipeline is held, and, in response, each of the mutiplexer portions selects for the input fed back from the output of the corresponding register portion.

As discussed above, the first input to GHV0 logic 402 is provided by an output MUX 414. MUX 414 is a five-way, n-fold, multiplexer, the input of which provides a value of the GHV in accordance with each of a set of actions that may cause the GHV to be modified. MUX 414 selects for the signal on one of the five inputs in response to a signal from control logic 416. The conditions associated with each of the inputs, denoted cache miss path 408, prediction redirection path 410, hold path 412, misprediction path 420 and advance path 426 will now be described. The operation of GHV logic 311 in rendering each of the inputs active will be described in detail in conjunction with FIGS. 6–9 where each of the inputs is associated with a set of steps within the inventive principles of the methodology disclosed therein.

Hold path 412 is active if the processor holds the instruction pipeline. Processors, such as CPU 11 in FIG. 1, may hold a pipeline if, for example, an instruction issue queue in an execution unit is full. In response, control logic 416 selects for outputting the signal on hold path 412, which is provided by the output of GHV0 logic 402. Likewise, the assertion of hold 422 selects the feedback input in each of the MUX portions of logic 402, 404 and 406 from the output of the corresponding register portion.

In the event of a cache miss, cache miss path 408 becomes active in response to signal 423 from control logic 416. (A cache miss may be signaled by I-cache 40, FIG. 2A.) If a cache miss occurs, the GHV is backed up by two cycles. Thus, cache miss path 408 taps off of the output of the register portion of GHV2 logic 406. The event timing associated with a cache miss is summarized in Table I. (It is assumed for illustrative purposes that fetch addresses are obtained from a BTAC. Generally, in a CPU embodiment without a BTAC, a simple algorithm, for example, next sequential fetching, may be used, but this would not substantively affect the principles illustrated in the Tables.) In Table I, the sequence of addresses in the IFAR are denoted by Ij and the values of the GHV are denoted by gj, where j is a numerical label indicating the relative position of the corresponding one of Ij or gj in the sequence of IFAR addresses or GHVs. Similarly the cache sector pointed to is denoted by Cj. Cycle 0 is the current cycle. The operations which may be performed by control logic 416 in signaling MUX 414 to select for cache miss path 408 will be described in conjunction with FIGS. 6–9.

TABLE I

| Cycle | IFAR | GHV | Actions |
|---|---|---|---|
| 0 | I0 | g0 | Next IFAR address I1' is obtained from BTAC. Read attempt at cache sector C0 pointed to by I0. |
| 1 | I1' | g1 | Cache misses. Read attempt at cache sector C1 pointed to by I1'. Next IFAR address from BTAC. |
| 2 | I2 | g2 | Branch prediction indicates that after C0, next fetch at address I1. Cache sector C1 discarded. |
| 3 | I1 | g1 | GHV in sync. Normal pipeline advances resumes. |
| 4 | I2 | g2 | . |
|   |    |    | . |
|   |    |    | . |

Control logic 416 selects prediction redirection path 410 as the active path if a branch prediction target is different than the IFAR as determined by a BTAC reference or, alternatively, a simple IFAR advancing algorithm. As previously discussed, the BTAC information may precede the branch history predictions by several cycles. If the IFAR value as determined by the BTAC, and the branch prediction differ, the prediction may override, and the GHV needs to be backed up to synchronize the IFAR and the GHV. When prediction redirection path 410 is active, the value of the GHV output by GHV1 logic 404 is selected via MUX 414. The operations which may be performed by control logic 416 in signaling MUX 414 to select for prediction redirection path 410 will also be described in conjunction with FIGS. 6–9.

TABLE II

| Cycle | IFAR | GHV | Actions |
|---|---|---|---|
| 0 | I0 | g0 | Next IFAR address I1' is determined from BTAC |
| 1 | I1' | g1' | Cache sector, C0, pointed to by I0 is read. All the branches (if any) in the fetch group C0 are located, GHV g3 has a shift (if any) due to these branches. Branch predictions are determined for all the branches in C0. Predictions determine fetching should start from I1 following C0 (BTAC prediction wrong.) In cycle 3, the predicted address I1 is put in IFAR and instructions fetched from C1' sector are discarded. Next IFAR address I2' is determined from BTAC. (I2' is also wrong). |
| 2 | I2' | g2' | Cache sector C1' pointed to by I1' read. Sector C1' discarded. Next fetch from I1 as determined from branch prediction. |

TABLE II-continued

| Cycle | IFAR | GHV | Actions |
|---|---|---|---|
| 3 | I1 | g1 | IFAR and GHV in sync. Normal pipeline advance resumes |

If, on resolution, a branch is mispredicted, misprediction path 420 becomes the active path for MUX 414. A branch misprediction may be detected by misprediction GHV select logic 422 in response to a branch direction value from BIQ 58d (FIG. 2B) and the outcome of the branch on execution from BXU 56 (FIG. 2A). In further response, control logic 416 generates signals to select misdirection path 420. Additionally, GHV select logic 422 selectively sets one or more of the GHVs received from BIQ 58c1, BIQ 58c2 and BIQ 58c3 into one or more of first GHV register 440, second GHV register 442 and third GHV register 444.

The value of the GHV on misprediction path 420 depends on the resolution of the branch, and the position of the mispredicted branch instruction in the fetch group. The selected ones of the GHVs from the BIQ set into registers 440–444 depends on the branch outcome ("taken" or "not taken") as well as the position of the branch in the fetch group, obtained from BIQ 58e. The setting of GHV values in the registers 440–494 will be described in discussing the process of generating the GHV in conjunction with FIGS. 6–9. The output of first GHV register 440 provides the input to MUX 414 on misprediction path 420.

If there is no instruction fetch redirection from one or more branch instructions in the fetch group, or a cache miss, or from an instruction pipeline hold, then the instruction pipeline can advance normally. Advance path 426 is then active, however, because of the "fast forwarding" of instruction fetches, the value of the GHV on advance path 426, which is then provided to GHV0 logic 402 via MUX 414, depends on prior misdirection and hold events. MUX 424 outputs the selected GHV on advance path 426 from one of second GHV register 442, third GHV register 444, shifter output 504 (FIG. 5A), previous advance path register 446, and hold advance path register 448. (MUX 424 may be a five-way, n-fold MUX.) Recall that the setting of GHV registers 442 and 444 is performed by misprediction GHV set logic 422 in response to a branch misprediction. Values set in previous advance path register 446, and hold advance path register 448 via to outputs 456 and 458, respectively, from control logic 416 which operates to "steer" GHV data from the sources to the targets, depending on a preceding redirection event. The setting of the GHV values in previous advance path register 446, and hold advance path register 448 will be described further in conjunction with FIG. 7. The operation of shifter 502 (FIG. 5A) will be discussed in conjunction with FIGS. 5A and 5B. The values of the IFAR and GHV in a normal pipeline advance are summarized in Table III.

TABLE III

| Cycle | IFAR | GHV | Actions |
|---|---|---|---|
| 0 | I0 | g0 | Next IFAR address I1 is determined from BTAC. |
| 1 | I1 | g1 | Cache sector, C0, pointed to by I0, is read. All the branches (if any) in the fetch group C0 are located. Next IFAR address I2 is determined from BTAC |
| 2 | I2 | g2 | Cache sector C1 pointed to by I1 read. All branches (if any) in the fetch group C1 are |

TABLE III-continued

| Cycle | IFAR | GHV | Actions |
|---|---|---|---|
| | | | located. GHV g4 has the shift (if any) due to these branches. |
| | | | Next IFAR address I3 is determined from BTAC. |
| 3 | I3 | g3 | g3 has shift due to branches in group C0 (if any). |
| 4 | I4 | g4 | IFAR advances. |

Figure 5A:
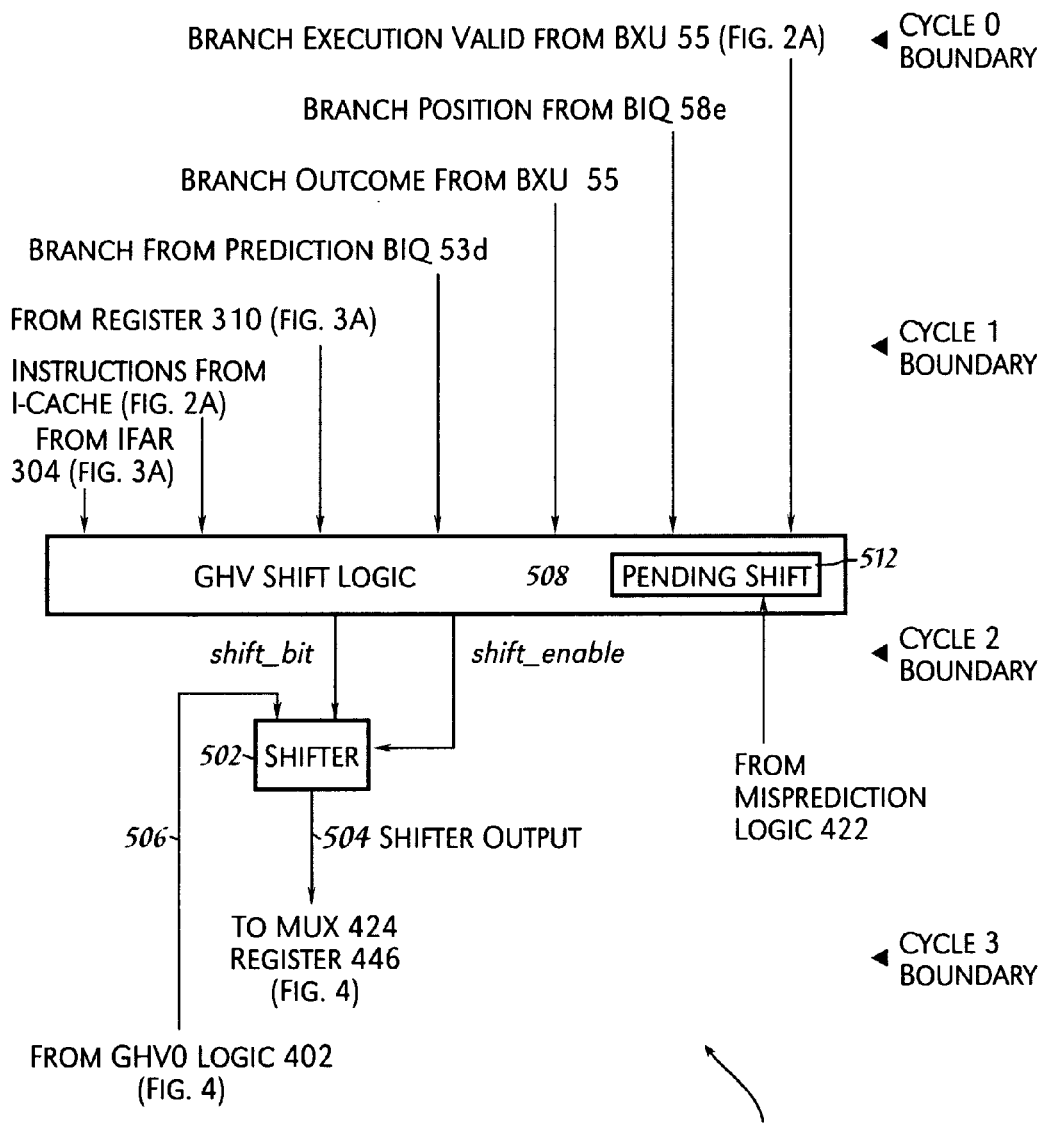
FIGS. 5A and 5B illustrate another portion of the circuitry of FIG. 3B in further detail.

Referring now to FIG. 5A, there is illustrated therein GHV update unit 315 in further detail. Update unit 315 includes shifter 502 which provides an updated GHV on output 504 to GHV select unit 313 as previously described. Shifter 502 generates the new GHV from the value received from GHV0 logic 402 on input 506 in response to a shift_bit signal and a shift_enable signal.

Figure 5B:
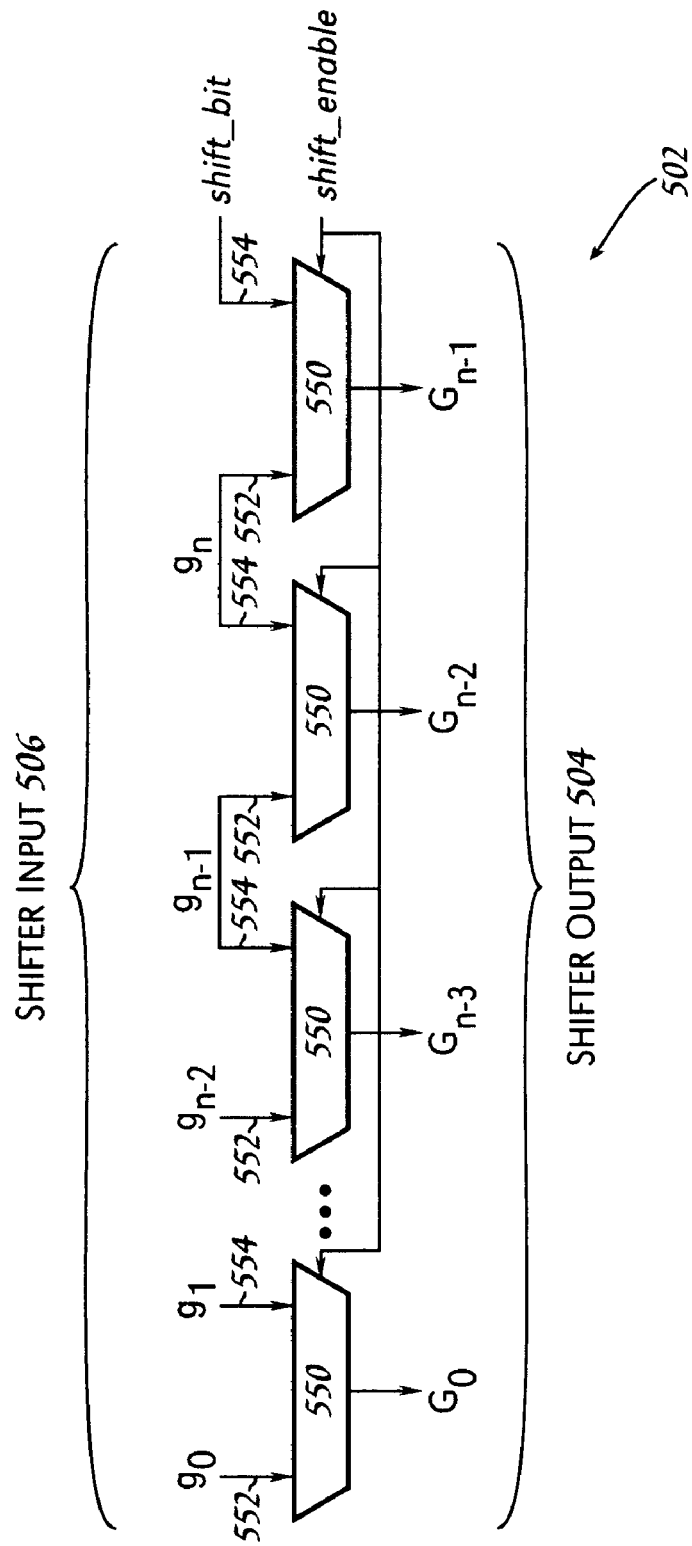

FIG. 5B illustrates a shifter 502 which may be used in the present invention. Shifter 502 in the embodiment illustrated in FIG. 5B includes a plurality of MUXs 550. Each MUX 550 has a pair of inputs, and selects between the signals on each of the inputs of the pair in response to the shift_enable signal. In response to the shift_enable signal being asserted, each MUX 550 of the plurality selects for the signal on an input 554, and in response to the shift_enable being negated, each MUX 550 of the plurality selects for the signal on an input 552. Thus when shift-enable is asserted, the new GHV is generated by left shifting, in the embodiment of FIG. 5B, a "1" or a "0" into the prior GHV, and when shift-enable is negated, the "shifted" GHV is unchanged. The value of the shift_bit takes the value "0" or "1" depending on the value to be shifted into the GHV on shifter input 506 to form the new GHV on output 504 as the pipeline advances. The generation of the shift_bit and shift_enable signals in response to fetched branches will be described in detail below.

Returning to FIG. 5A, the shift_bit and shift_enable signals are generated by GHV shift logic 508. The operation of GHV shift logic 508 will be described in detail in conjunction with FIGS. 6–9. However, the operation may be briefly summarized. In the description of the operation of GHV update unit 315 in FIG. 5A, triangular fiducials have been depicted in FIG. 5A to denote the processor cycle at which data is accessed or becomes valid, relative to the current cycle which is denoted as cycle 0.

In cycle 0, the IFAR points to the current fetch group. The address is passed to GHV logic 508, along with the instructions fetched in response thereto from the I-cache. Also the direction of each branch in the current fetch group and the branch prediction for each is retrieved from the BIQ during cycle 0. In cycle 1, predictions for each of the branches in the fetch group at cycle 0, if any, are input to GHV shift logic 508. If there is an unconditional branch in the fetch group, or a conditional branch predicted taken, then a predetermined value, for example "1", may be shifted into the GHV. GHV shift logic 508 then outputs the value "1" for the shift_bit, and asserts shift_enable. If there are one or more predicted "not-taken" conditional branches in the fetch group, then a second predetermined value, for example, "0" may be shifted into the GHV. Again, GHV shift logic 508 outputs the value to be shifted into the GHV, "0" in this case, and asserts shift_enable. Otherwise, the GHV output from the shifter is unchanged, and GHV shift logic 508 negates shift_enable.

Additionally, in the event of a branch misprediction, or other redirection event, the GHV must be backed up to the GHV value a predetermined number of cycles earlier than the cycle in which the redirection event occurs. In an embodiment of the present invention in accordance with branch prediction apparatus 300, FIG. 3A, the GHV may be backed up three cycles. GHV shift logic 508 must set shift_enable accordingly. GHV shift logic 508 receives the branch direction data and branch prediction data for each of the entries in the BIQ, and, additionally receives the outcome, from the BXU, for a branch instruction executing in cycle zero, if any. Additionally, a branch execution valid signal is also received from the BXU to indicate that a branch instruction is executing in the current cycle, cycle 0. GHV shift logic 508 may then detect a branch misprediction in response to these signals. The operation of GHV shift logic 508 will be further described in discussing the process of generating the GHV with FIGS. 6–9. The operation pending shift register 512 will also be discussed in conjunction with the methodology described therein.

The operation of GHV logic 311, FIGS. 3A and 3B may be further understood by referring now to FIGS. 6–9, illustrating in flow chart form, a methodology for generating the GHV in accordance with the principles of the present invention. The flow charts provided herein are not indicative of the serialization of operations being performed in one embodiment of the present invention. The processes disclosed within these flow charts may actually be performed in parallel.

Figure 6:
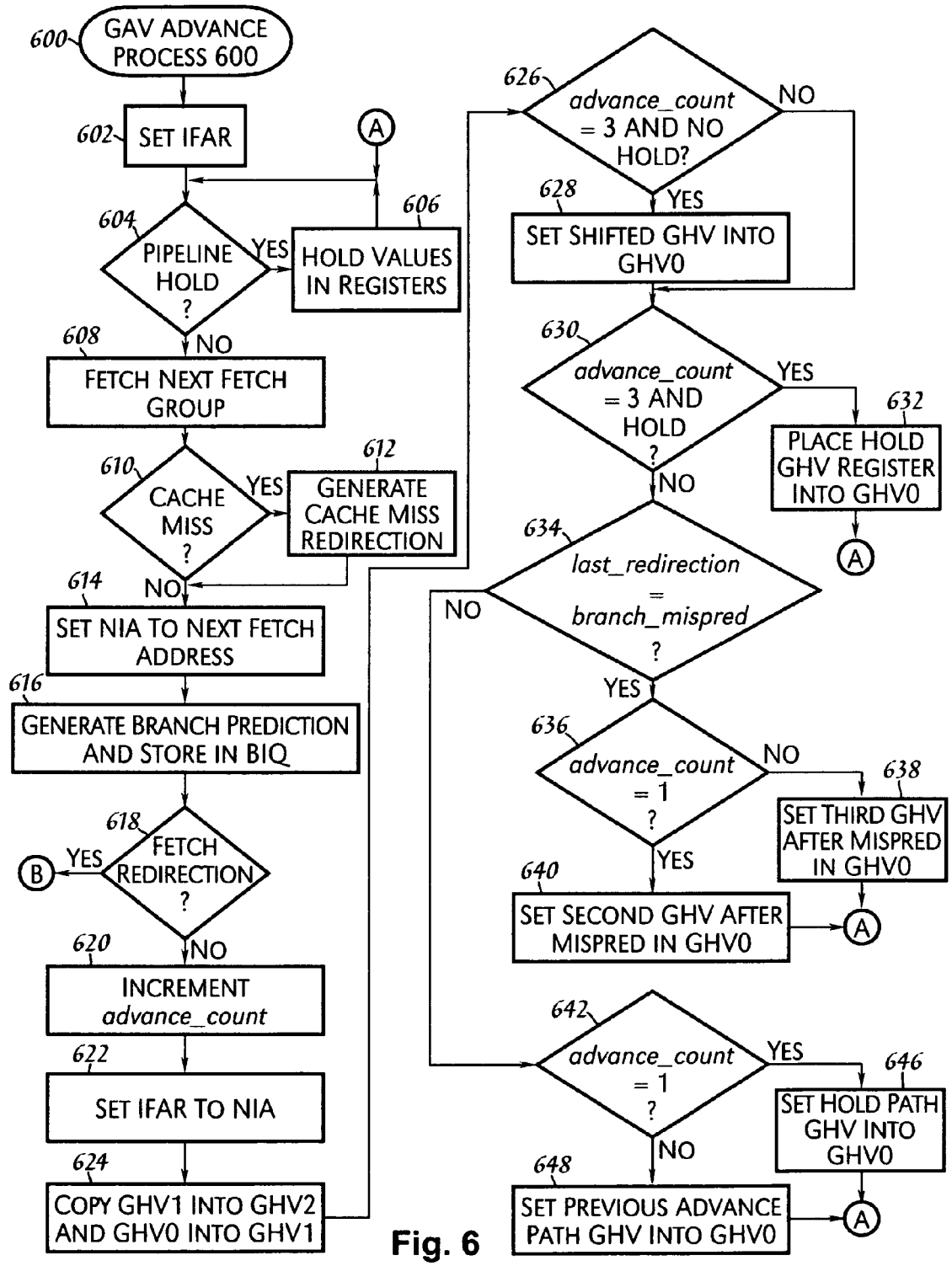
FIGS. 6–10 illustrate, in flow chart form, a branch prediction methodology in accordance with the principles of the present invention.

Referring first to FIG. 6, portion 600 of the methodology of the present invention, associated with normal pipeline advances, is illustrated. In step 602 the IFAR is set to a first instruction in the program, and a normal pipeline advance commences unless, the processor, such as CPU 10 (FIG. 2A), issues a pipeline hold. A pipeline hold may occur, for example, if a queue, such as a dispatch queue (not shown) in dispatch unit 48, FIG. 2A is full. If the pipeline is held, the process of the present invention, in step 604, loops, holding the corresponding data values in the registers in GHV logic 311 until the pipeline can advance, and step 604 exists via the "No" branch. In step 608 the next fetch group is fetched. This fetch group is pointed to by the value in the IFAR set in step 602. If the fetch group has not been prefetched into the I-cache, then a cache miss occurs, and step 610 proceeds by the "Yes" branch and a cache miss redirection signal is generated, step 612. For example, in addition to a cache miss, the methodology of the present invention may also generate a redirection on the event of a branch misprediction, or a branch prediction different from an IFAR advance, as will be discussed further hereinbelow.

If there is no cache miss, then the pipeline can advance normally, and step 610 proceeds by the "No" branch and the next instruction address (NIA) constituting the address of the next fetch group to be fetched, is generated and set in register, such as NIA register 324, FIG. 3A. The next instruction address is generated and the NIA register set in step 614. Recall that address generation may be implemented using a BTAC, or in an alternative embodiment a simple generation algorithm, for example, next sequential addressing, may be used. Note that step 614 may take more that one cycle to complete, however, as previously discussed, steps may be deserialized, and in an embodiment of the present invention, process 600 may proceed before step 614 completes.

In step 616 branch predictions for conditional branches in the fetch group fetched in step 608, if any, are generated. A methodology for generating branch predictions in accordance with the principles of the present invention will be described hereinbelow in conjunction with FIG. 9. Additionally, circuits, systems and methods for generating branch predictions, as well as updating branch history tables, such as branch history tables 301 and 302, FIG. 3A, are described in detail in the commonly owned, co-pending U.S. patent application entitled "Circuits, Systems and Methods for Performing Branch Predictions or Selectively Accessing Bi-Modal and Fetch-Based Branch History Tables," incorporated herein by reference.

In step 618, it is determined if a fetch redirection has been received. A redirection may, in step 618, be indicated by a signal generated in response to the redirection event. Recall that, for example, a cache miss redirection signal is generated in step 612. (Thus, in such an embodiment, determining if a redirection has been received may, for simplicity, be referred to as detecting the signal.) Other redirection events will be discussed hereinbelow in conjunction with FIGS. 9 and 10.

If a fetch redirection has not been received, step 618 proceeds by the "No" branch and performs steps 620–648. These steps correspond to rendering advance path 426, FIG. 4, active. Additionally, as discussed above, the processes in accordance with the principles of the present invention may be performed in parallel. Also, GHV update methodology in accordance with the principles of the present invention loops as instructions are fetched, returning to step 604, and therefore redirection events may subsequently occur as the process of the present invention loops. Thus, the data values in advance path 426 are selected from one of the inputs in MUX 424, FIG. 4 via control logic 416, which may perform a portion of steps 620–648, in response to a prior redirection event. The type of redirection event may be signaled by a data value in last redirection register 454, FIG. 4, discussed further hereinbelow.

Proceeding along the "No" branch from step 618, in step 620 a data value, which will be referred to as advance_count, is incremented. The advance_count data value may be contained in advance_count register 452, FIG. 4. The value of advance_count may, in embodiment of the present invention in which the GHV lags the IFAR by two cycles, saturate at three.

In step 622, the address in the IFAR is set to the NIA. In step 624, the value (referred to as GHV1) in the register portion of GHV1 logic 404 is set into the register portion of GHV2 logic 406, and the value (GHV0) in the register portion of GHV0 logic 402 is set into the register portion of GHV logic 404 to become a new GHV1. Step 624 may be performed by the action of the respective multiplexer portions of GHV1 logic 404 and GHV2 logic 406, and the corresponding register portions in response to clocks 562 and 564, respectively.

In step 626, the value of advance_count is determined, and if the value of advance count is three and there was no pipeline hold in the previous cycle (which may be determined by the value in last redirection register 454, FIG. 4) then in step 628, the "shifted" GHV0 is set in the register portion of GHV0 logic 402 as the new value of GHV0. This may be performed by control logic 416, FIG. 4, selecting for the input into MUX 424 from shifter output 504, FIG. 5A and outputting the value from shifter out 504 (FIG. 5A) on advance out 457. The generation of the shifted GHV value to generate to the new GHV0 will be described in conjunction with FIG. 9.

If either a pipeline hold was received in the previous cycle, or the value of advance_count is not three, step 628 is bypassed, and in step 630 it is determined if the failed condition in step 626 was a pipeline hold received in the previous cycle. If so, in steps 632 the new value of GHV0 set into the register portion of GHV0 logic 402 is obtained from the value in hold advance path register 448. This may be performed by control logic 416, FIG. 4, selecting the corresponding input in MUX 424. The process then loops back to step 604. Otherwise, in step 630, the value of advance-count must have not been equal to three and step 630 proceeds by the "No" branch to step 634.

In step 634 it is determined if the last redirection was a branch misprediction. This may be determined by the value in last redirection register 454, FIG. 4 having the corresponding predetermined value (referred to herein as branch_mispred) representing a branch misprediction redirection. If so, in step 636, the value advance_count is tested. If, in step 636 advance_count equals one, then in step 640 the GHV in second GHV register 442, FIG. 4 is set into the register portion of GHV0 logic 402. This may be performed by control logic 416 selecting the corresponding input in MUX 424. If, however, in step 636, advance_count is not equal to one, then, in step 638, the GHV in third GHV register 444, FIG. 4 is set into the register portion of GHV0 logic 402, by, for example, control logic 416 selecting the corresponding input into MUX 424. After either step 638 or 640, the process loops back to step 604.

Returning to step 634, if the last redirection was not a branch misprediction, then the methodology proceeds by the "No" branch to step 642. In step 642 the value advance-_count is tested, and if advance_count equals one, then in step 646 the value of the GHV in hold advance path register 448, FIG. 4 is set into the register portion of GHV0 logic 402. This may be performed by control logic 416 selecting the corresponding input in MUX 424. If, however, in step 642, the value of advance_count is not equal to one, then, in step 648, the value of the GHV in previous advance path register 446 is set into the register portion of GHV1 logic 402, by, for example, control logic 416 selecting the corresponding input in MUX 424. Following either step 646 or 648, the process loops back to step 604.

Figure 7:
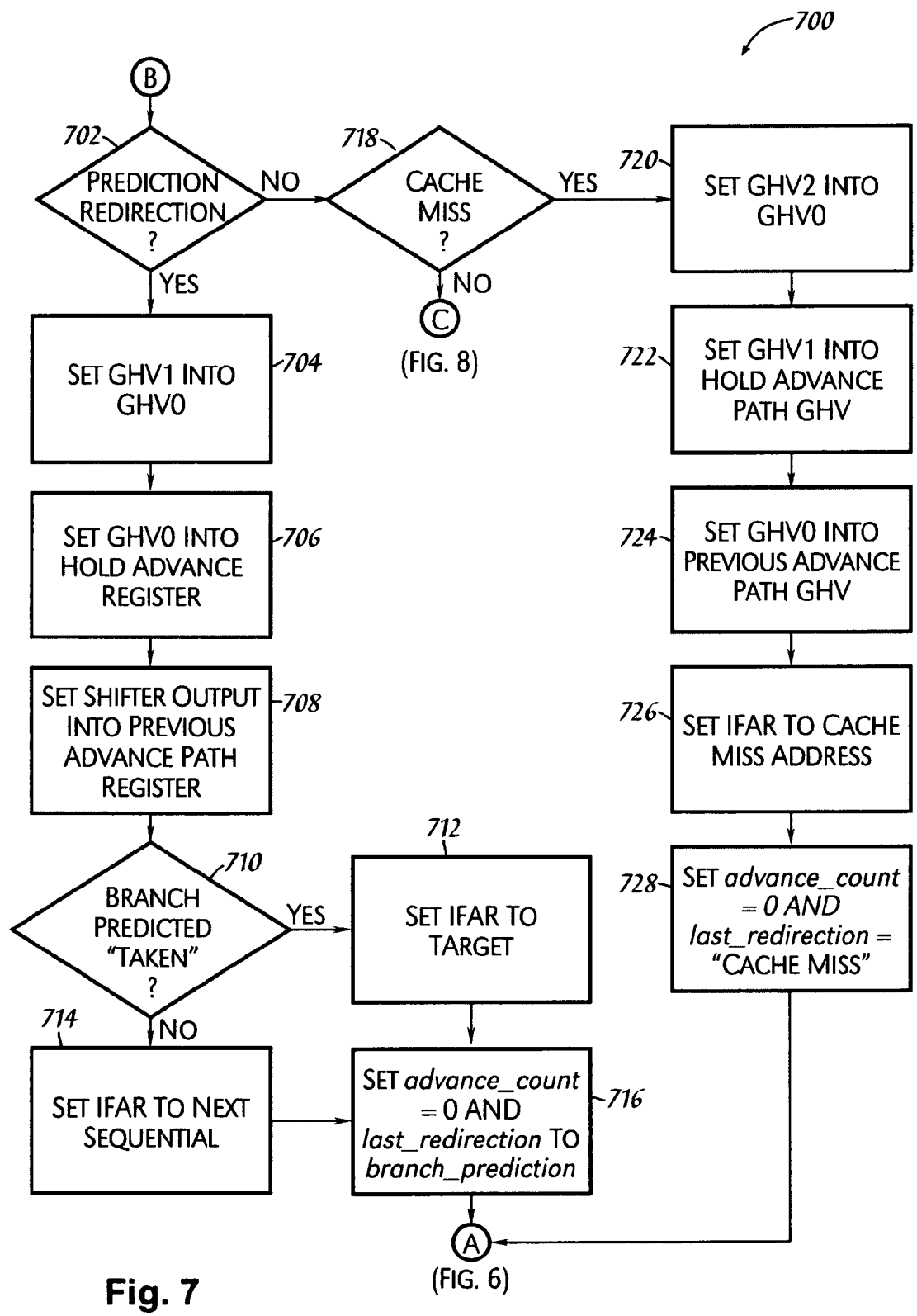

Returning to step 618, if a fetch redirection was received, step 618 proceeds by the "Yes" branch. Refer now to FIG. 7, illustrating portion 700 of the methodology in accordance with the principles of the present invention for maintaining the GHV in sync with fetched branches in the event a fetch redirection has occurred.

Recall, as discussed hereinabove in conjunction with FIG. 4 and Table II above, that the IFAR may advance ahead of the return of predictions for the branches in the current fetch group, if any. The IFAR advance, as discussed above, may be generated by a simple algorithm, for example, a next sequential address or in an embodiment of CPU 10, FIG. 2A having a BTAC, advancing the IFAR in accordance with the BTAC address. Therefore, the next IFAR may point to an address that is different than an address resulting from the branch predictions. In step 702, it is determined if a prediction redirection has been received. (Generation of a prediction redirection is discussed in conjunction with FIG. 9.) If so, the process of the present invention performs steps 704–716, which selects prediction redirection path 410, FIG. 4.

In step 704, the value in the register portion of GHV1 logic 404, FIG. 4 is set into the register portion of GHV0 logic 402 via the action of MUX 414, whereby control logic 416 selects for the input to MUX 414 from prediction redirection path 410. (Control logic 416 may activate prediction redirection path 416, and perform other operations discussed below in response to the assertion of redirection signal 511.) Additionally, in step 706, the value of the GHV, GHV0, in the register portion of GHV0 logic 402 is loaded into hold advance path register 448 via control logic 416. In step 708, the value of the GHV at output 504 of shifter 502, FIG. 5A, the two cycle delay path GHV, is set into previous advance path register 446, FIG. 4. This may be performed by control logic 416 providing this value on previous advance out 458.

In step 710, it is determined if a prediction for a branch in the current fetch group is predicted "taken." If so, in step 712, the IFAR is set to the target that branch predicted taken, otherwise, step 714, the IFAR is set to the next sequential address. In step 716, advance_count is set to "0" and the value in last redirection register 454, FIG. 4, is set to a predetermined value (referred to herein for purposes of illustration by branch_prediction) which will be used to signal a branch prediction redirection event resulting from the IFAR advance differing from the branch prediction in step 702. Process 700 then loops back to step 604, FIG. 6.

Returning to step 702, if the redirection received in step 618 (FIG. 6) is not a prediction redirection (IFAR advance does not differ from a branch prediction, or if there are no branches in the fetch group), then in step 718, it is determined if a cache miss has been received. If a cache miss has been received, then the process of the present invention performs steps 720–728, which also effectuate the operation of cache miss path 408, FIG. 4.

In step 720, the GHV value in the register portion of GHV logic 406 is set into the register portion of GHV0 logic 402. This may be performed by control logic 416 selecting the input into MUX 414 on cache miss path 408. In step 722, GHV1, in the register portion of GHV1 logic 404 is set into hold advance path register 448, which may be performed via control logic 416 setting GHV1 on advance output 456. Additionally the value GHV in the register portion of GHV0 logic 402 is set into previous advance path register 446, step 724. This value may be input to advance path register 446 via previous advance output 458 from control logic 416. In step 726, the IFAR is set to the cache miss address. An advance_count of "0" is set in register 452, and last_redirection is set to cache_miss, step 728. Process 700 of the present invention then loops back to step 604, FIG. 6.

Returning to step 718, if a fetch redirection was received in step 618 and is not a cache miss, then the fetch redirection is necessarily a branch misprediction redirection, and the methodology of the present invention performs a portion of the process to synchronize the GHV and instruction fetches in the event of a branch misprediction.

Figure 8:
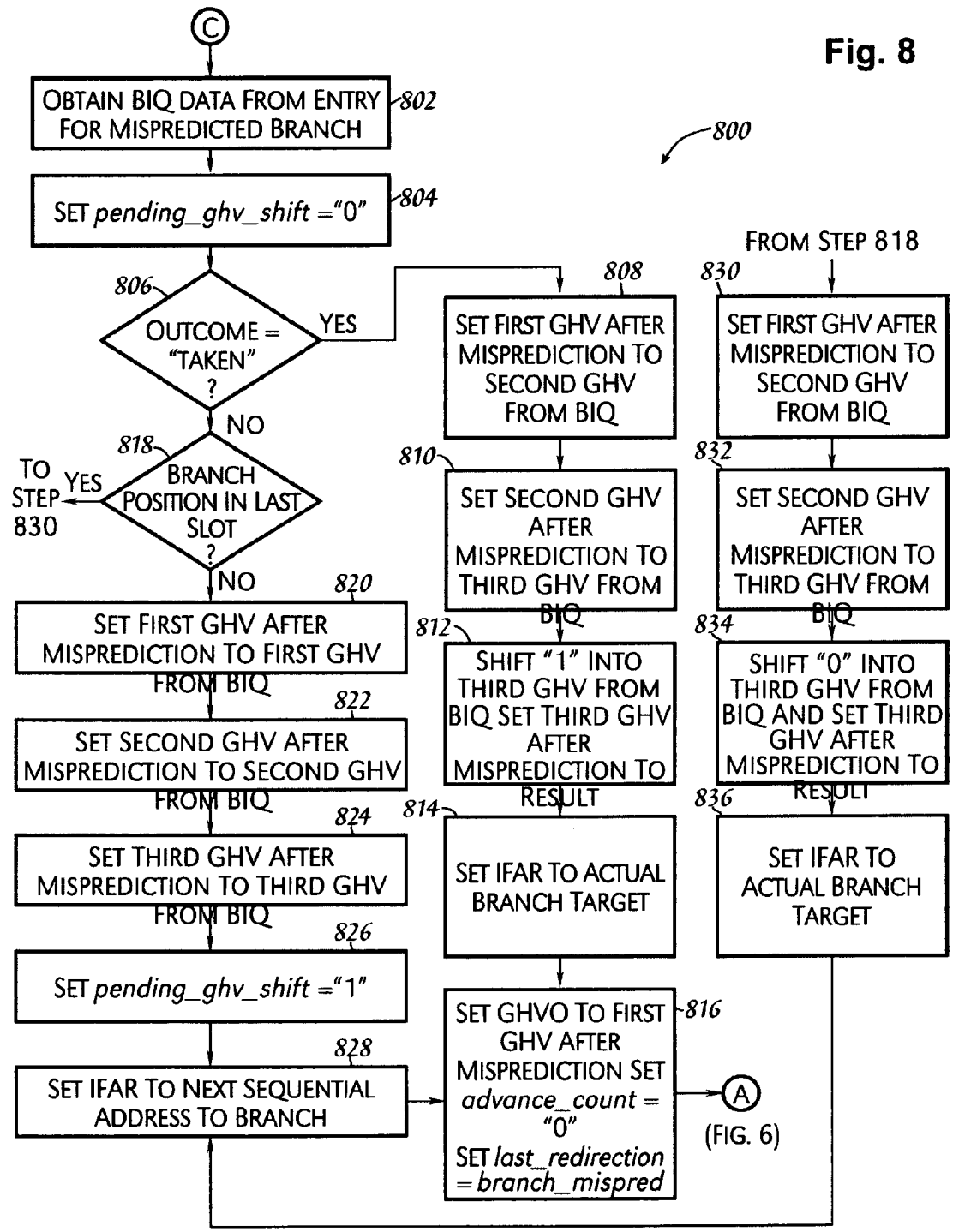

This process portion 800 is illustrated in FIG. 8. The methodology to synchronize the GHV after a misprediction may be performed by misprediction GHV set logic 422, FIG. 4, and GHV shift logic 508, FIG. 5 as will be discussed further below.

In step 802, the BIQ data from the entry for the mispredicted branch is accessed. As indicated in FIGS. 4 and 5, portions of the BIQ data is sent to misprediction GHV set logic 422, and GHV shift logic 508. In step 804, the data value in pending shift register 512, which will be denoted pending_ghv_shif is set to "0".

In step 806, it is determined if the actual outcome of the mispredicted branch is "taken". If so, then the process of the present invention proceeds by the "Yes" branch and performs steps 808–816. Otherwise, if the outcome is not taken, the process performs steps 820–836 discussed below.

Considering first the portion of process if the actual outcome is "taken" in step 808 the first GHV after misprediction is set to the second GHV from the BIQ, field 58c2, which may be performed by setting the value in field 58c2 into first GHV register 440. The second GHV after misprediction is set to the third GHV from the BIQ, field 58c3, step 810, which, likewise, may be performed by setting the third GHV from the BIQ into second GHV register 442.

In step 812, a "1" is shifted into the third GHV from the BIQ, field 58c3. The third GHV from the BIQ may be provided to the input of shift 502, FIG. 5A, via BIQ out 459 from GHV set logic 422, and control logic 416. Additionally, in response to detecting the misprediction and the "taken" outcome, in step 808, GHV shift logic 508, FIG. 5A may assert shift_enable and set the value, shift_bit to "1" to perform the shift of step 812. GHV set logic 422 may receive the result on shift input 461 via control logic 416, and set the result into third GHV register 444, FIG. 4.

In step 814, the IFAR is set to the actual branch target. In step 816, advance_count is set to "0" and the value in last redirection register 454, FIG. 4 is set to a predetermined value representing a branch misprediction, which will be denoted branch_mispred. Recall that the value in the last redirection register 454 to recover the GHV when the methodology of the present invention loops back to step 604. When a normal pipeline advance resumes after a fetch redirection. (See for example, step 634, FIG. 6.) Following step 828, the process loops back to step 604.

Returning to step 806, if the outcome is not taken, the process proceeds to step 818, and it is determined if the mispredicted branch is in the last slot of the fetch group. Recall the the position of the branch in stored in the corresponding entry of the BIQ, for example in field 58e, FIG. 2B. If, in step 818, the branch is not in the last slot, then steps 820–828 are performed.

In the step 820, and sets the first GHV after misprediction to the first GHV from the BIQ. This may be performed by misprediction set logic 422 setting the value in BIQ field 58c1 corresponding to the first GHV from the BIQ into first GHV register 440. Similarly, in steps 822 and 824, respectively, the second GHV after misprediction is set to the second GHV from the BIQ, field 58c2 and the third GHV after misprediction is set to the third GHV from the BIQ field 58c3. The second GHV after misprediction may be set in second GHV register 442, and the third GHV after misprediction set in third GHV register 444 by GHV set logic 422, FIG. 4. In step 826, pending_ghv_shift is set to "1", which may be set in the same fashion as previously described at step 804. In step 828 the IFAR is set to the next sequential address to the mispredicted branch. The address of the mispredicted branch may be obtained from field 58a from the corresponding BIQ entry 58, FIG. 2B. The value of GHV0 and last redirection register 454 are set, step 816, previously described hereinabove.

Returning to step 818, if the mispredicted branch is in the last slot, then step 818 proceeds by the "Yes" branch. In step 830 the first GHV after misprediction is set to the second GHV from the BIQ, field 58c2, which may be performed in similar fashion to step 808. Similarly in step 832 the second GHV after misprediction is set to the third GHV from the BIQ, field 58c3, which may be effected in the same way as step 810. In step 834, "0" is shifted into the value of the third GHV from the BIQ, field 58c3, and the result is set into the third GHV after misprediction. Step 834 may be performed in similar fashion to step 812, however, in step 834, GHV shift logic 508, FIG. 5, negates shift bit, corresponding to the shift of the value "0" into the value of the GHV stored in field 58c3 of the BIQ. The process proceeds to step 828 and sets the IFAR to the next sequential address to the mispredicted branch, and then to step 816 to set the value of GHV0 and the last redirection register 454, as previously described.

Process 800 then loops back to step 604, FIG. 6.

The backing up of the GHV in the branch misprediction may be further understood by referring now to Table IV. In Table IV, the state of a four-bit GHV is illustrated as the pipeline advances. Additionally, in the example of Table IV, it is also assumed for simplicity, that there is a single conditional branch in each fetch group. It will also be assumed for the purposes of illustration that the misprediction occurs at cycle thirteen. That is, the branch that appeared in the fetch group at cycle 0 is executed in cycle 13 and the misprediction signal is received in cycle 14. The current GHV0, used to predict the branch in the fetch group at cycle 0, and likewise for the single branch in each of the fetch groups in the subsequent cycles is shown in the second column of the table, labeled current GHV. The entries in Table IV denoting a value of the GHV constitute a four bit sequence denoted by lower case letters. Each letter represents a value of the bits making up the GHV and stands for either the value "0" or "1" which each of the bits can assume. The value of the BHT prediction bit for the single conditional branch assumed to appear in each fetch group is given in the third column of the table, labeled BHT prediction. The first, second and third GHV values, which are stored in the corresponding field in the BIQ entry for the branch in each of the fetch groups in the respective cycle in Table IV are provided in the column labeled first GHV, second GHV and third GHV. Recall that the GHV lags by two cycles in the embodiment of the present invention depicted herein. Thus, for example, the GHV at the start of cycle 0, having the value "abcd" was generated based on a prediction of the conditional branch in the fetch group fetched two cycles earlier. The prediction for the branch in the fetch group fetched at cycle 0 has the value "g". This value is shifted into the GHV that is the current GHV at the start of cycle three. The value "e" has been shifted into the GHV at cycle 0 to provide the GHV, current in cycle 1, having the value "bcde", wherein the left most bit having the value "a" has been shifted off the end of the GHV. The remaining GHV's in the second column of Table IV are generated similarly. The current GHV, that is the GHV used to predict the current branches in each cycle is also stored in the BIQ at the corresponding entry in the field labeled first GHV. The next succeeding GHV is stored in the corresponding entry in the field labeled second GHV, and the GHV generated in the second succeeding cycle is stored in the corresponding entry in the field labeled third GHV. These values are also illustrated in Table IV in the respective columns.

As previously noted, it is assumed that in cycle 13, the branch fetched at cycle 0 executes, and the prediction, "g" is determined to be incorrect. Consequently, the GHV used to predict the branch having the value "defg" is incorrect. To correct the GHV is to predict the branch at cycle 3, the GHV, "defg" is backed up two cycles. Thus, in cycle 15 the current GHV is set to the value "bcde" which may be retrieved from the second GHV field in the BIQ entry corresponding to the mispredicted branch.

TABLE IV

| Current | | | To BIQ | |
|---|---|---|---|---|
| Cycle | GHV | BHT | First GHV | Second GHV | Third GHV |
| 0 | abcd | g | abcd | bcde | cdef |
| 1 | bcde | h | bcde | cdef | defg |
| 2 | cdef | i | cdef | defg | efgh |
| 3 | defg | j | defg | efgh | fghi |
| 4 | efgh | k | efgh | fghi | gjok |
| 5 | fghi | l | fghi | ghij | hijk |
| ... | ... | ... | ... | ... | ... |
| 13 | nopq | t | nopq | opqr | pqrs |
| 14 | Misprediction: signal "g" is incorrect! | | | | |
| 15 | bcde | h' | bcde | cdef | defg' |
| 16 | cdef | i' | cdef | defg' | efg'h' |
| 17 | defg' | j' | defg' | efg'h' | fg'h'i' |
| 18 | efg'h' | k' | efg'h' | g'h'i'j' | h'i'j'k' |

The value of the GHV at cycle 16 is backed up similarly, using the value in the third GHV field in the corresponding BIQ entry. The corrected prediction "g'" is shifted into this value to generate the current GHV in cycle 17, "defg'". The prediction values for the branches in the current fetch group, if any, and the setting of the BIQ entries therefore may be performed in accordance with the principles of the present invention as illustrated in FIG. 9.

Figure 9:
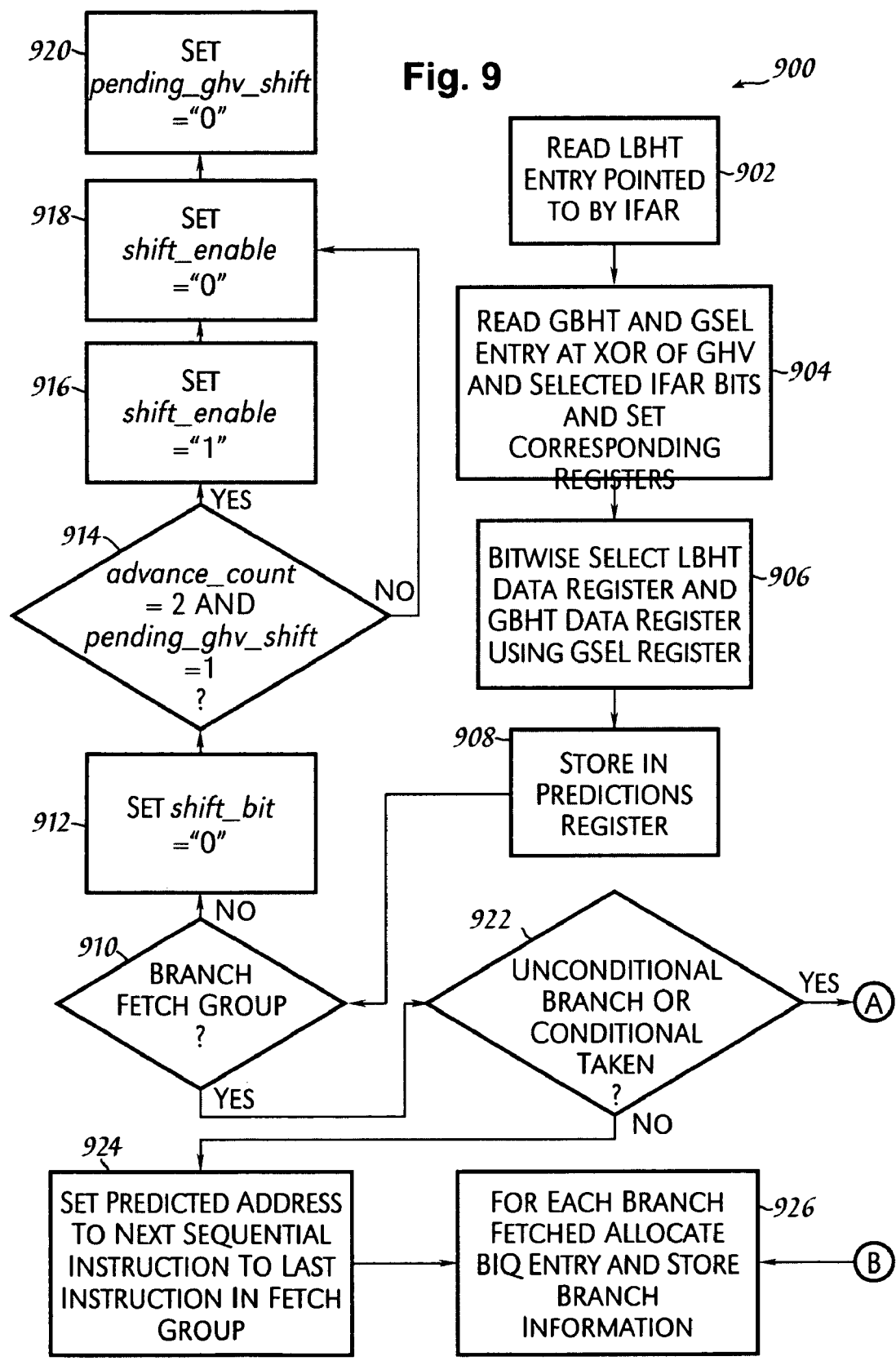

Branch prediction process portion 900 in FIG. 9 includes portions which operate in accordance with the invention of the commonly owned co-pending U.S. patent application entitled "Circuits, Systems and Methods for Performing Branch Predictions by Selectively Accessing Bi-modal and Fetch-based Branch History Tables," which has been previously referred to, and which is incorporated herein by reference. Process 900 may be used to perform step 616, FIG. 6.

In step 902, the entry in the LBHT pointed to by the value in the IFAR is read. The addressing of entries in LBHT via the IFAR has been discussed hereinabove in conjunction with FIG. 3A. In step 904, the GBHT and GSEL entries pointed to by the gbht_read_addr, as also described hereinabove in conjunction with FIG. 3A, is read. In step 906, the LBHT data is selected in response to the value in the corresponding entry in GSEL 303. The branch history table data, either the LBHT data or the GBHT data, may be selected via MUX 308 in response to the GSEL data. For example, as described above, in an embodiment of the present invention, a logic "0" in the corresponding entry in GSEL 303 selects the output from LBHT 301 and a logic "1" selects the output from GBHT 302. In an embodiment of the present invention in accordance with apparatus 300 of FIG. 3A, the LBHT data, the GBHT data, and the GSEL data may be held in respective data registers, for example, LBHT data register 320, GBHT data register 322, and GSEL data register 324. The selected data is stored in a prediction register, such as prediction register 310, in step 908. The prediction register may contain $2^s$ bits corresponding to a fetch group having a corresponding number of instructions. The position of each conditional branch is determined by s bits of the branch address. Typically these are the s least significant bits (LSB) but as would be recognized by the ordinarily skilled artisan, these need not need necessarily be the LSB, but maybe another set of s bits of the address.

In step 910, it is determined if there are any branches in the fetch group. If not, process 900 performs steps 912–920. In step 912, shift_bit is said equal to "0". Step 912 may be performed by GHV shift logic 508, FIG. 5A. If the value of advance_count is two and pending_ghv_shift is equal to "1," step 914, then shift_enable is asserted, that is, in a positive logic embodiment, said equal to "1," in step 916. Conversely, if advance_count is not equal to two or pending_ghv_shift is not equal to "1," step 916 is bypassed, and in step 918 shift_enable is said equal to "1." Following either step 916 or 918, in step 920, pending_ghv_shift is negated, or reset to "0" in a positive logic embodiment of the present invention.

Returning to step 910, if the fetch group includes one or more branches, step 910 proceeds by the "Yes" path to step 922. In step 922 it is determined if at least one of the branches in the fetch group is either an unconditional branch or a conditional branch predicted "taken." If neither condition is satisfied, step 922 proceeds by the "No" path and in step 924 the predicted address is the next sequential instruction to the last instruction in the fetch group. In step 926, for each of the branches in the fetch group, a BIQ entry is allocated and the branch information is stored, and in particular, the predicted address set in step 924 is set in the branch prediction field 58d, FIG. 2B.

If, however, in step 922 it is determined the fetch group includes an unconditional branch or a conditional branch predicted "taken," then step 922 proceeds by the "Yes" path. In step 928, the target of the first branch satisfying the conditions in step 922 are calculated or predicted. The nature of the specific branch instruction determines whether the target address is a predicted address or a calculated address. For example, if the instruction is a relative branch, the target address may be calculated by adding the branch target operand to the current instruction address. Similarly, an absolute branch instruction branches to the absolute address represented by the target operand. On the other hand, the target address of a conditional branch is predicted, using the corresponding prediction stored in step 908. Additionally, in step 928, the predicted address is set to the calculated or predicted target, and the remaining instructions in the fetch group discarded.

In step 930, the address determined in step 930 is compared to the address in the NIA. If these differ, a branch misprediction signal is generated step 932. Recall, this will give rise to a fetch redirection in step 618, FIG. 6. Conversely, if the address predicted or calculated, as appropriate, in step 928 is the same as the NIA, then step 932 is bypassed.

In step 934 it is determined if the unconditional, or conditional predicted taken branch is the last branch in the fetch group. If not, shift_bit is negated or, set equal to "0" set, step 936. Otherwise, step 936 is bypassed and in step 938, shift_bit is asserted, or set equal to "1." In step 939, shift_enable asserted, or set to "1" in a positive logic embodiment. Process 900 then proceeds to step 926 and allocates a BIQ entry for each of the fetched branches and stores the branch information therein, as previously discussed.

Figure 10:
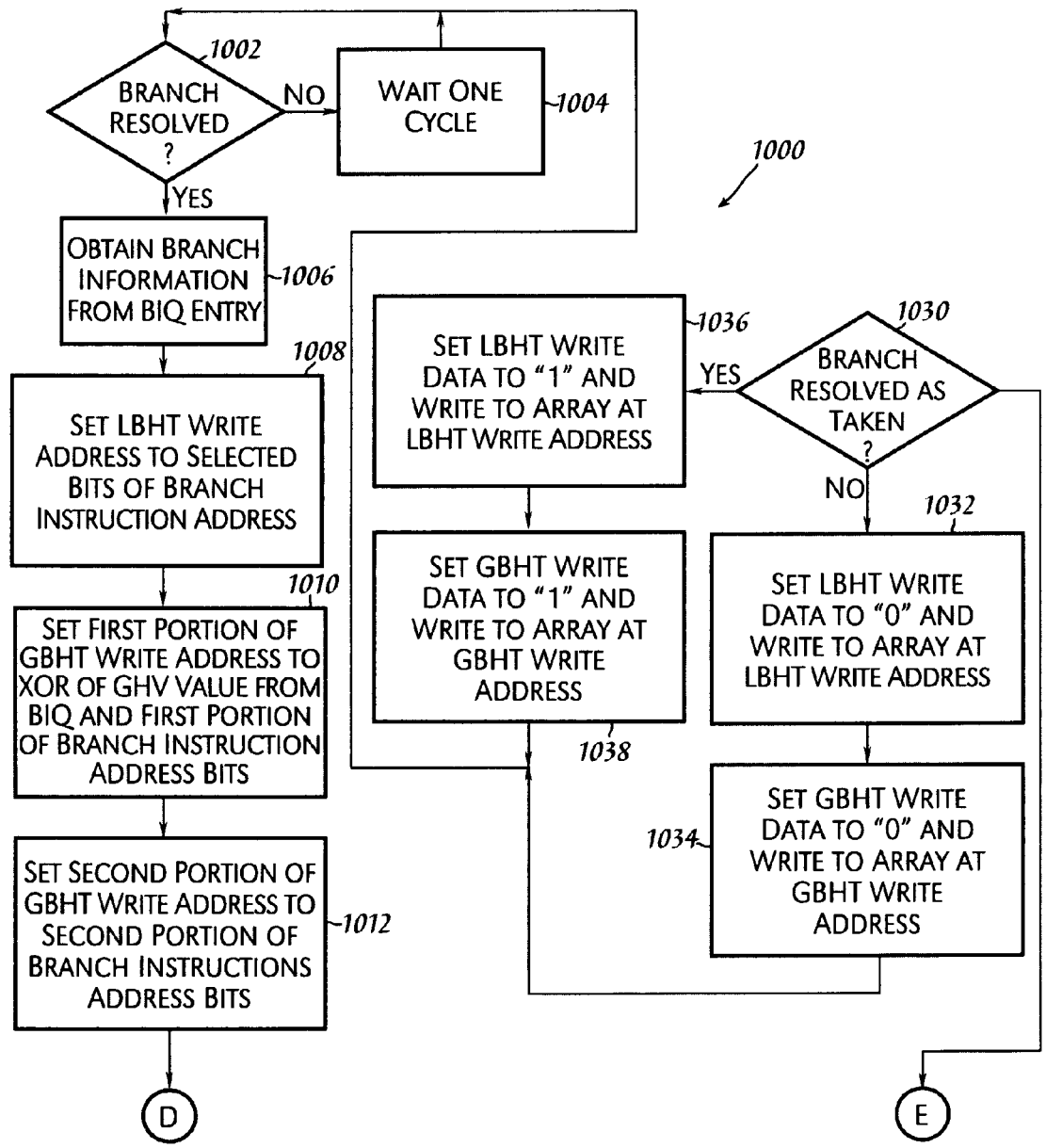
Figure 10:
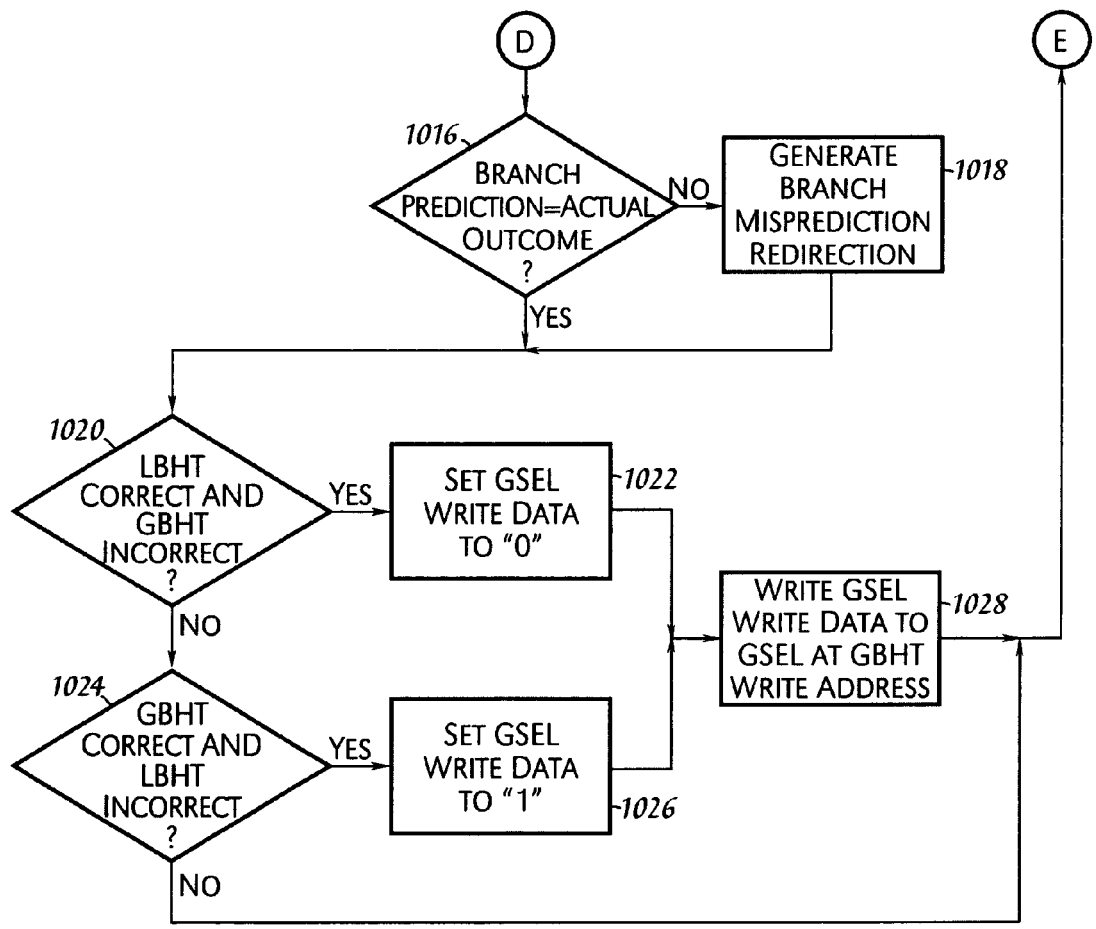

Refer now to FIG. 10 illustrating a process portion 1000 including a methodology for updating the branch history table entries in accordance with embodiment of the present invention. Process 1000 includes steps described in detail in the commonly-owned U.S. patent application entitled "Circuits, Systems and Methods for Performing Branch Predictions by Selectively Accessing Bimodal and Fetch-Based Branch History Tables" incorporated herein by reference. In step 1002, it is determined if the branch instruction has been resolved in a current processor cycle. If not, methodology 1000 waits one cycle, in step 1004. Otherwise, if a branch has been resolved, in step 1006 the branch information is obtained from the corresponding BIQ entry. In step 1008, the value of lbht_write_addr is set to m bits of the branch address from the BIQ, for example from BIQ field 58a, in a BIQ entry in accordance with entry 58 of FIG. 2B. Similarly, in step 1010, the value of gbht_write_addr is set to the XOR of n bits of the branch address and the value of the n-bit GHV from the BIQ entry, for example from field 58c1 of BIQ entry 58 in FIG. 2B. The remaining portion of gbht_write_addr constituting the remaining m-n bits of the m-bit branch address from the corresponding BIQ entry field, as previously described hereinabove in conjunction with FIG. 3A, is set in step 1012. Recall that in an embodiment of the present invention, m may be fourteen and n may be eleven.

In step 1016, it is determined if the branch prediction is the actual outcome. This may be performed by misprediction GHV set logic 422, FIG. 4, in response to the branch execution valid signal and branch outcome from BXU 55 (FIG. 2A), and the prediction from BIQ 58b. If not, instep 1018 a branch misprediction redirection signal is generated. (This may be used in step 618, FIG. 6. Wherein, in response thereto, GHV select logic 416, FIG. 4, and GHV logic 311 may select misprediction path 420 as the active path.) If, however, in step 1016 the prediction and actual outcome are the same, step 1018 is bypassed.

In step 1020, it is determined if the prediction from the LBHT is correct, and the prediction from the GBHT incorrect. If so, in step 1022, the value of gsel_write_data is set to "0." Otherwise, in step 1020, the "No" branch is followed and in step 1024 it is determined if the GBHT is correct and the LBHT prediction incorrect. If so, in step 1026, the value of gsel_write_data is set to "1." In an embodiment of the present invention, in accordance with methodology 1000 in which, in step 1022 the value of gsel_write_data is set to "0" and the value, in step 1026, of gsel_write_data is set to "1," MUXs 308 select data from LBHT data register 320 in response to a logic state of "0" and select for data from GBHT data register 322 in response to a logic state of "1". However, an artisan of ordinary skill in the art would recognize that a complementary embodiment MUXs 308 may be used in which embodiment a value of "1" would be written in step 1022, and a value of "0" would be written in step 1026 of methodology 1000. It would be further understood by an artisan of ordinary skill in the art that such an alternative embodiment would be in the spirit and scope of the present invention.

After setting the value of gsel_write_data in either step 1022 or 1026, the value of gsel_write_data is written to the entry in GSEL 303 pointed to by the value of gbht_write_addr in step 1028. If, however, in step 1024, the GBHT prediction is incorrect or the LBHT prediction is correct, that is, the LBHT and GBHT predictions were both correct or both incorrect, wherein step 1020 takes the "No" branch, steps 1022, 1026 and 1028 are bypassed, and the corresponding entry in GSEL 303 is unchanged.

Next, the entries in the LBHT and GBHT are updated. In step 1030, it is determined if the branch resolved as taken. If not, lbht_write data is set to "0" and written to the LBHT at the entry pointed to by lbht_write_addr, step 1032. Similarly, the value of gbht_write data is set to "0" and written to the GBHT entry pointed to by gbht_write_addr, step 1034. Methodology 1000 then returns to step 1002. If, however, in step 1030, if the branch was resolved as taken, then, in step 1036, the value of lbht_write_data is set to "1" and written to the LBHT at the address pointed to by lbht_write_addr. Likewise, in step 1038, the value of gbht_write_data is set to "1" and written to the GBHT at the entry pointed to by gbht_write_addr, and methodology 1000 returns to step 1002. It would be understood by an artisan of ordinary skill that a complementary embodiment of the present invention may be implemented in which complementary values of lbht_write_data and gbht_write_data are used in steps 1032, 1034 and 1036, 1038, respectively, and such an embodiment would be within the spirit and scope of the present invention. Additionally, an alternative process for updating the branch history tables and detecting a branch misprediction, which may be used in an embodiment of the present invention, may be found in the aforementioned commonly-owned U.S. patent application entitled "Circuits, Systems and Methods for Performing Branch Predictions by Selectively Accessing Bimodal and Fetch-Based Branch History Tables."

Figure 11:
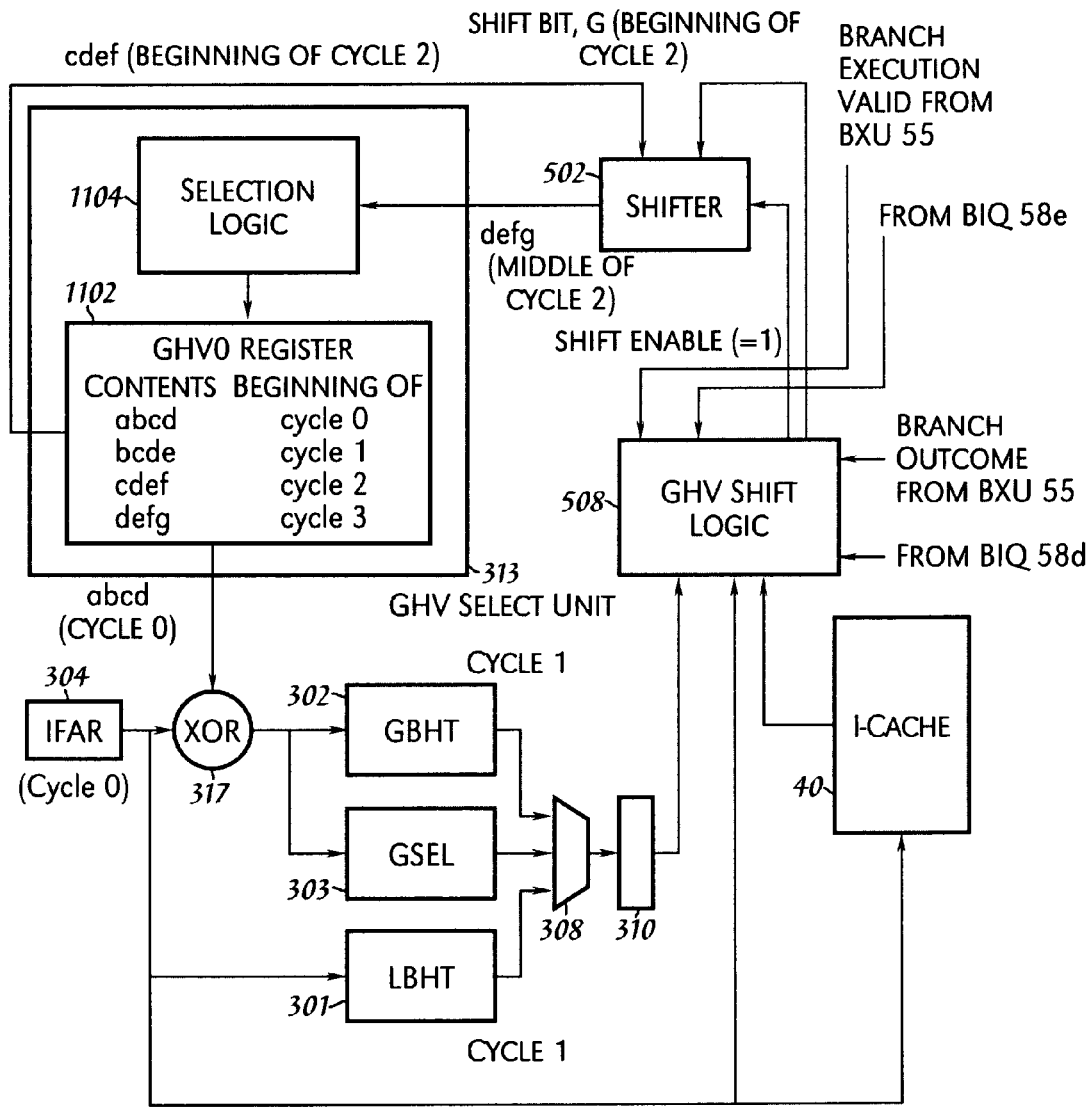
FIG. 11 illustrates a dataflow in accordance with the principles of the present invention.

The overall dataflow for branch prediction circuitry 300 in accordance with the principles of the present invention is shown in FIG. 11. As in the discussion of Tables I–IV above, a four-bit GHV is assumed for purposes of illustration, and the values of the succeeding GHVs for a three cycle pipeline advance (relative to the current cycle) are illustrated using the notation previously described in conjunction with Tables I–IV. In FIG. 11, the register portion of GHV0 logic 402, FIG. 4, is explicitly shown as GHV0 register 1102, and the value of GHV0 contained therein also depicted over the exemplary four cycle advance. Select logic 1104 includes the remaining portion of GHV select unit 313. The stages of the generation of the GHV at the beginning of cycle, "defg," 3 are shown.

Although the present invention and its advantages have been described in detail, it should be understood that various changes, substitutions and alterations can be made herein without departing from the spirit and scope of the invention as defined by the appended claims.

What is claimed is:

1. A method of generating a global history vector comprising the steps of:
   determining if a selected group of instructions contains a branch instruction;
   maintaining a current global history vector in a shift register when the selected group does not contain a branch instruction;
   shifting a first value into the shift register to generate a second vector if the selected group contains a branch instruction and the branch instruction is predicted as a branch taken; and
   shifting a second value into the shift register to generate a second vector when the selected group contains a branch instruction and the selected group does not include a branch instruction predicted as a branch taken.

2. The method of claim 1 and further comprising the step of storing the generated value in an entry in a branch instruction queue associated with the selected group of instructions.

3. The method of claim 2 and further comprising the step of correcting the generated vector upon a misprediction comprising the substeps of:
   retrieving a selected number of bits of the vector stored from the branch instruction queue into the shift register; and
   shifting an updated history bit into the shift register.

4. The method of claim 1 wherein the first value comprises a logic 1 and the second value is a logic 0.

5. The method of claim 1 wherein the selected group of instructions comprises eight instructions.

6. A method of performing branch predictions comprising the steps of:
   indexing a branch history table using a first global history vector associated with a first fetch group of instructions during a first fetch cycle to retrieve a first prediction value;
   generating a second global history vector associated with a second fetch group of instructions comprising the substeps of:
      retaining the first vector when the first fetch group does not contain at least one branch instruction;
      appending a bit of a first value to the first vector when the first fetch group has at least one branch instruction predicted to be a branch taken;
      appending a bit of a second value to the first vector when the first group contains at least one branch instruction and contains no branch instructions predicted to be a branch taken; and
      indexing the branch history table using the second global history vector during a second fetch cycle to retrieve a second branch prediction value.

7. The method of claim 6 and further comprising the step of storing the first and second vectors in an entry of a branch history queue associated with the first fetch group.

8. The method of claim 7 and further comprising the steps of:
   detecting a branch misprediction based on the first prediction value;
   retrieving the first and second vectors from the branch history queue;
   indexing the branch history table using the first vector to correct the first prediction value; and
   appending a corrected bit to the second vector to generate a corrected branch history vector.

9. The method of claim 7 wherein said first fetch cycle precedes the second fetch cycle by three fetch cycles.

10. The method of claim 7 wherein said steps of indexing comprises the step of gating the vector with selected bits of a current instruction address.

11. The method of claim 10 wherein said steps of gating comprise the steps of performing XOR operations.

12. The method of claim 8 wherein said substeps of appending comprise the substeps of shifting a bit into a shift register storing the second vector.

13. Branch processing circuitry comprising:
   a shift register for storing a global history vector;
   control circuitry for selectively updating a first global history vector stored in said shift register operable to:
      determine if a selected group of instructions contains a branch instruction;
      maintain said first global history vector in said shift register when the selected group does not contain a branch instruction;
      shift a first value into the shift register to generate a second vector if the selected group contains a branch instruction and the branch instruction is predicted as a branch taken; and
      shifting a second value into the shift register to generate a second vector when the selected group contains a branch instruction and does not contain a branch instruction predicted as a branch taken.

14. The branch processing circuitry of claim 13 and further comprising a branch history table and circuitry for generating an index to an entry in said branch history table using selected bits from a current address and selected bits of said first vector to retrieve a prediction value stored therein.

15. The branch processing circuitry of claim 14 and further comprising circuitry for updating said second vector when said prediction value results in a misprediction comprising:
   a queue for storing said first and said second vectors;
   circuitry for accessing said vectors from said queue;

circuitry for indexing said branch history table with said first vector and updating a corresponding entry with a corrected prediction value; and circuitry for updating a vector in said shift register with said second vector; and circuitry for shifting the corrected prediction value into said shift register.

16. The branch processing circuitry of claim 13 wherein said branch processing circuitry forms a portion of a single-chip microprocessor.

17. A processing system comprising:
a microprocessor comprising:
  a branch history table for storing branch prediction values;
  a global history shift register for storing a global branch history vector;
  logic for generating an index to said branch history table and accessing prediction values stored therein using selected bits of a said branch history vector stored in said shift register; and
  control circuitry for updating a said global branch history vector stored in said shift register and operable to:
    retain a current vector stored in said shift register when a selected fetch group does not contain at least one branch instruction;
    shift a bit of a first value into said shift register to generate an updated vector when the selected fetch group has at least one branch instruction predicted to be a branch taken; and
    shift a bit of a second value into said shift register when said selected fetch group contains at least one branch instruction and contains no branch instructions predicted to be a branch taken.

18. The processing system of claim 17 wherein said microprocessor further comprises:
  a branch instruction queue having a plurality of entries each associated with a fetch group for storing at least first and second corresponding global history vectors;
  circuitry for detecting a misprediction associated with a prediction value retrieved from said branch history table and corresponding to said first global history vector in said branch instruction queue;
  circuitry for retrieving said first vector from said branch instruction queue and accessing a corresponding entry in said branch history table to correct said prediction value stored therein; and
  circuitry for retrieving and modifying said second vector to generate a corrected vector in said shift register.

19. The processing system of claim 17 wherein said processing system further includes a system memory coupled to said microprocessor by a bus.

20. The processing system of claim 17 wherein said fetch group comprises eight instructions.

* * * * *